US008994997B2

(12) United States Patent
Chen

(10) Patent No.: US 8,994,997 B2
(45) Date of Patent: Mar. 31, 2015

(54) IMAGE READING APPARATUS

(71) Applicant: Xingjing Chen, Nagoya (JP)

(72) Inventor: Xingjing Chen, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/946,356

(22) Filed: Jul. 19, 2013

(65) Prior Publication Data

US 2014/0029050 A1 Jan. 30, 2014

(30) Foreign Application Priority Data

Jul. 24, 2012 (JP) ................................ 2012-164037

(51) Int. Cl.

*G06F 3/12* (2006.01)
*G06K 15/00* (2006.01)
*G03G 15/00* (2006.01)
*H04N 1/00* (2006.01)

(52) U.S. Cl.

CPC ................ *G06K 15/40* (2013.01); *G06K 15/00* (2013.01); *G03G 15/00* (2013.01); *H04N 1/00* (2013.01); *G03G 15/605* (2013.01)

USPC .......................................... 358/1.15; 358/1.1

(58) Field of Classification Search

None

See application file for complete search history.

(56) References Cited

U.S. PATENT DOCUMENTS 5,182,650 A * 1/1993 Inoue et al. .................. 358/296
7,786,982 B2 * 8/2010 Tamura et al. ............... 345/173
7,843,610 B2 * 11/2010 Hoshi .......................... 358/474
8,095,631 B2 * 1/2012 Manico et al. ............... 709/222
2006/0203306 A1 * 9/2006 Hoshi .......................... 358/497
2009/0162123 A1 * 6/2009 Tsirline et al. ................. 400/76
2009/0257804 A1 * 10/2009 Manico et al. ................. 400/70
2011/0242571 A1 10/2011 Ogushi et al.
2011/0242612 A1 10/2011 Tsubakimoto et al.
2011/0242613 A1 10/2011 Ishida et al.
2011/0299134 A1 12/2011 Shimoyama et al.
2013/0286433 A1 * 10/2013 Matsushima et al. ........ 358/1.15

FOREIGN PATENT DOCUMENTS

JP 2001-253137 A 9/2001
JP 2011-103572 A 5/2011
JP 2011-217086 A 10/2011
JP 2011-217089 A 10/2011
JP 2011-217090 A 10/2011
JP 2011-258382 A 12/2011

* cited by examiner

*Primary Examiner* — Marcus T Riley

(74) *Attorney, Agent, or Firm* — Banner & Witcoff, Ltd.

(57) ABSTRACT

An image reading apparatus a chassis, a sheet supporting unit disposed on the chassis configured to receive a sheet of a document placed thereon, a reading unit movably disposed on the chassis and configured to read an image on the sheet placed on the sheet supporting unit while moving in a predetermined direction, a reference member provided at a side portion of the sheet supporting unit, the sheet being placed on the sheet supporting unit such that one end of the sheet contacts the reference member, and an electrostatic capacitive touch key unit disposed on a side portion of the chassis is provided. Additionally, the reference member and the electrostatic capacitive touch key unit are arranged at opposite side portions, in the predetermined direction, of the chassis.

9 Claims, 21 Drawing Sheets

IMAGE READING APPARATUS

CROSS-REFERENCE TO RELATED APPLICATION

This application claims priority under 35 U.S.C. §119 from Japanese Patent Applications No. 2012-164037 filed on Jul. 24, 2012. The entire subject matter of the application is incorporated herein by reference.

BACKGROUND

1. Technical Field

The following description relates to an image reading apparatus.

2. Related Art

An image reading apparatus including an operation panel with electrostatic capacitive touch keys has been known.

The operation panel includes a panel substrate and a panel cover disposed over the panel substrate. The touch keys include touch key electrodes electrically connected with a signal processing circuit mounted on the panel substrate. When a touch position in a surface of the panel cover, which faces the touch key electrode, is touched by a finger of a user, electrostatic capacitance between the finger and the touch key electrode is changed. The signal processing circuit detects the change of the electrostatic capacitance and determines that the touch position is touched by the finger of the user based on the detection.

The image reading apparatus includes a contact glass and a reading unit movably disposed below the contact glass. A document sheet, which is a subject to be read by the image reading apparatus, is placed on the contact glass while an end (e.g., left end) of the document sheet is positioned at a reference position on a left side portion of the contact glass. Then, light is emitted from the reading unit to the document sheet on the contact glass while moving. An image sensor of the reading unit receives light reflected by the document sheet and an image formed on the document sheet is read.

The operation panel is disposed on a near side of the contact glass. In this case, the user is likely to touch the touch key upon placing the document sheet on the contact glass and an unintended operation of the image reading apparatus might occur.

SUMMARY

Aspects of the present invention are advantageous to provide an image reading apparatus which is capable of suppressing the unintended touch by the user to of the touch key.

According to aspects of the present invention, an image reading apparatus including a chassis, a sheet supporting unit disposed on the chassis configured to receive a sheet of a document placed thereon, a reading unit movably disposed on the chassis and configured to read an image on the sheet placed on the sheet supporting unit while moving in a predetermined direction, a reference member provided at a side portion of the sheet supporting unit, the sheet being placed on the sheet supporting unit such that one end of the sheet contacts the reference member, and an electrostatic capacitive touch key unit disposed on a side portion of the chassis is provided. Additionally, the reference member and the electrostatic capacitive touch key unit are arranged at opposite side portions, in the predetermined direction, of the chassis.

According to another aspects of the present invention, an image reading apparatus including a chassis, a sheet supporting unit disposed on the chassis configured to receive a sheet of a document placed thereon, a reading unit movably disposed on the chassis and configured to read an image on the sheet placed on the sheet supporting unit while moving in a predetermined direction, a reference member provided at a side portion of the sheet supporting unit, the sheet being placed on the sheet supporting unit such that one end of the sheet contacts the reference member, and an operation panel having a plurality of operating units including an electrostatic capacitive touch key unit and configured to be operated for setting the image reading apparatus is provided. Additionally, the reference member and an operating unit other than the electrostatic capacitive touch key unit are arranged on the same side portion, in the predetermined direction, of the chassis.

BRIEF DESCRIPTION OF THE ACCOMPANYING DRAWINGS

DETAILED DESCRIPTION

Hereinafter, an embodiment according to aspects of the invention will be described with reference to the accompany drawings.

<Multifunction Peripheral>

Figure 1:
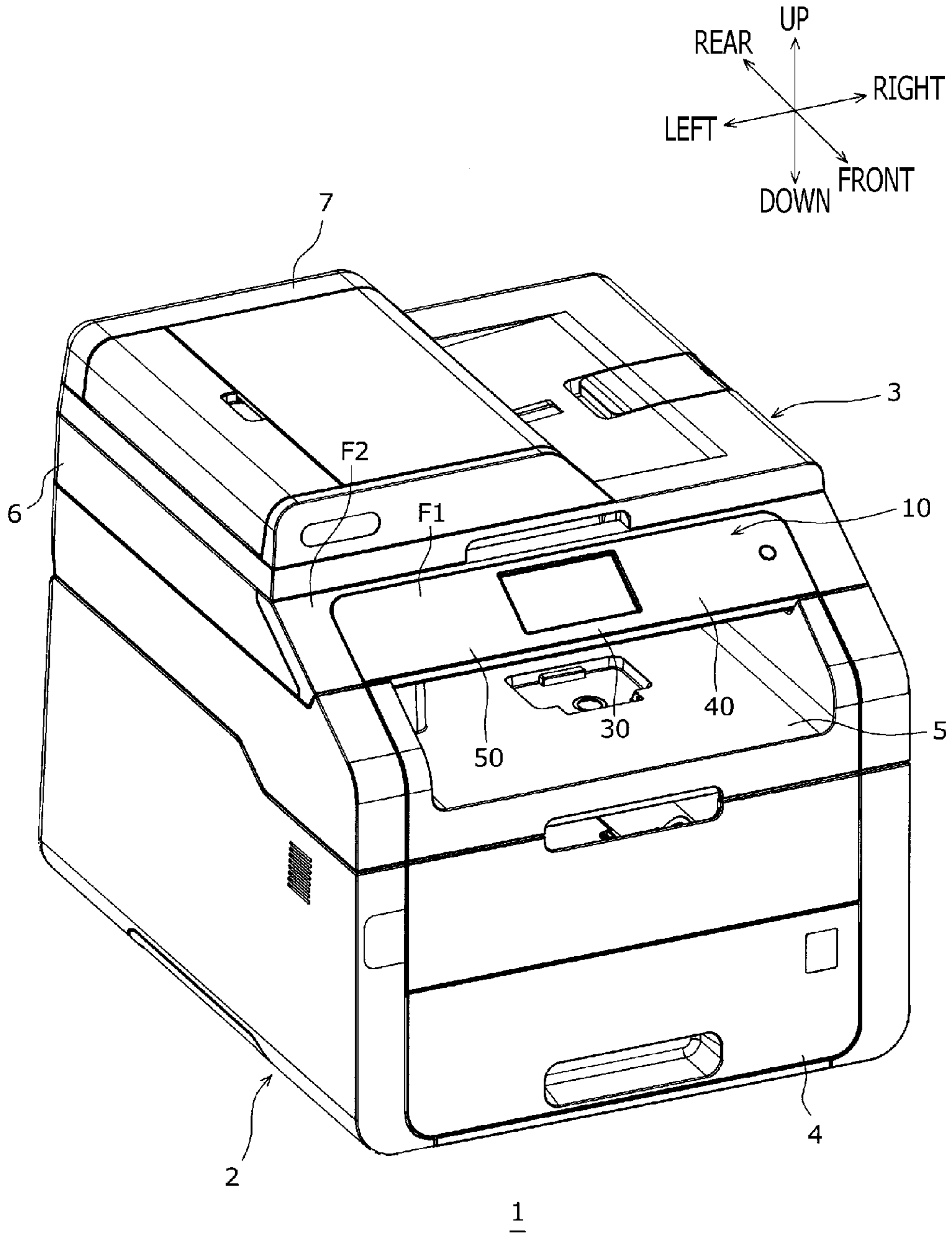
FIG. 1 is a perspective view showing a multifunction peripheral including an operation panel in an embodiment according to one or more aspects of the present invention, in a state where an ADF (Auto Sheet Feeder) is closed.
Figure 2:
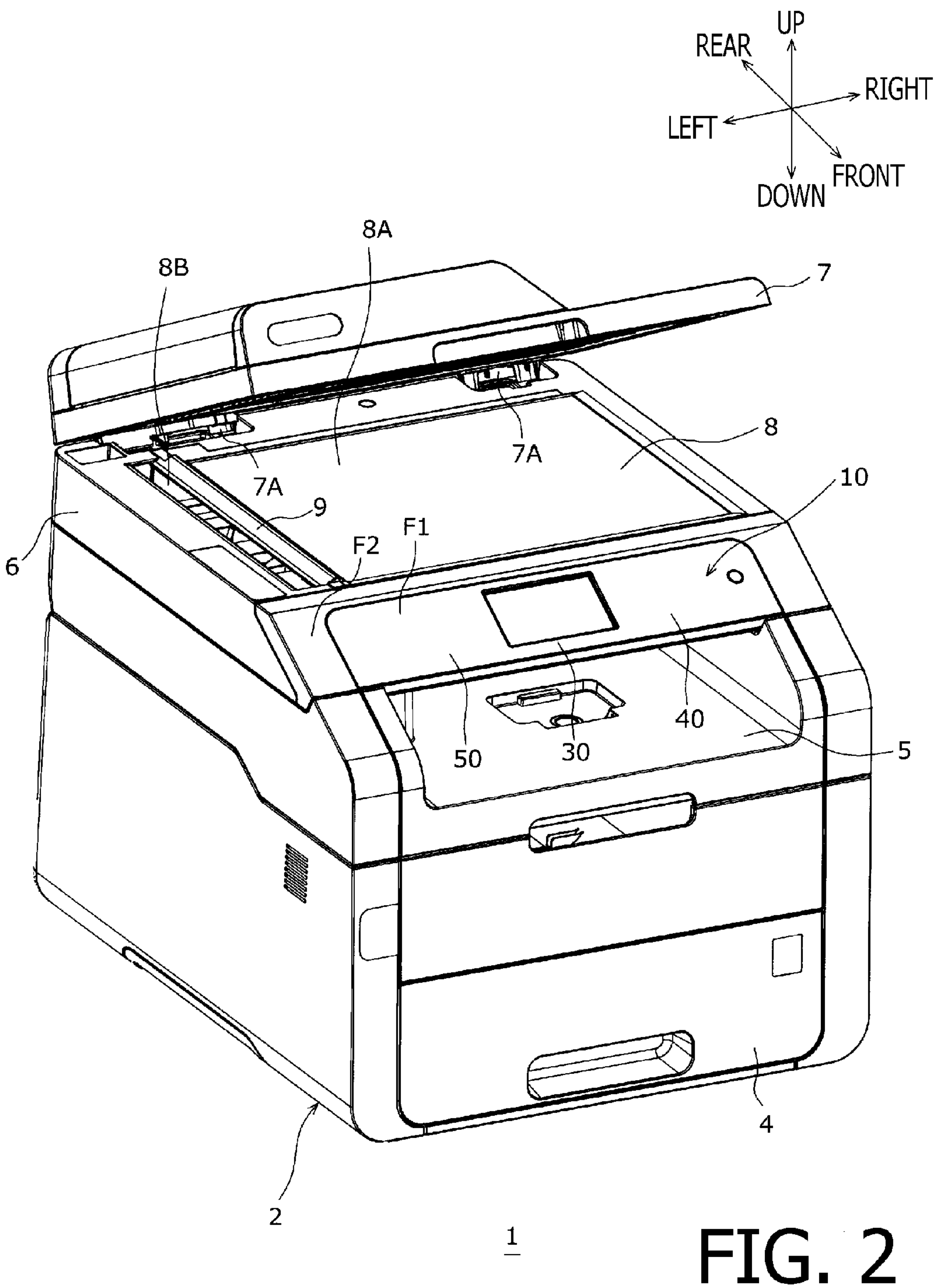
FIG. 2 is a perspective view showing the multifunction peripheral in a state where the ADF is opened.

As shown in FIGS. 1 and 2, a multifunction peripheral (hereinafter, referred to as "MFP") 1 has a printing function and a scanning function. The printing function is a function that forms an image on a medium, such as a sheet, based on image data. The scanning function is a function that reads an image on a document sheet. The MFP 1 may have a facsimile function that transmits and receives image data via a telephone communication.

It is noted that the following description refers to an up and down direction (the vertical direction), a front and rear direction, and a right and left direction (the horizontal direction) defined as shown in the accompanying drawings.

The MFP 1 includes an image forming device 2 that performs the printing function and an image reading device 3 that performs the scanning function.

<Image Forming Device>

The image forming device 2 is disposed blow the image reading device 3. The image forming device 2 includes a sheet feed tray 4 and a sheet discharge tray 5. The sheet feed tray 4 is disposed the lowest portion of the image forming device 2. The sheet feed tray 4 accommodates a plurality of sheets in a stacked manner. In the embodiment, the image forming device 2 adopts an electrophotographic system. In the electrophotographic system, a toner image is transferred and fixed on a sheet fed from the sheet feed tray 4 to form an image on the sheet. The sheet discharge tray 5 is formed on an upper face of the image forming device 2. The sheet on which the image is formed is discharged from the image forming device 2 to the sheet discharge tray 5.

<Image Reading Device>

The image reading device 3 includes a device body 6, an ADF (Auto Document Feeder) 7, a contact glass 8, a dividing member 9 and a CIS (Contact Image Sensor) unit 100.

A rear edge of the ADF 7 is coupled to a rear edge of the device body 6 via a hinge member 7A. The ADF 7 is rotatably displaceable round the hinge member 7A and can be located at a close position shown in FIG. 1 and an open position shown in FIG. 2*a*. The ADF 7 covers an upper face of the device body 6 at the close position. The upper face of the device body 6 is exposed when a front-side portion of the ADF 7 is lifted and moved at the open position.

The contact glass 8 is disposed on the upper face of the device body 6 as shown in FIG. 2. The contact glass 8 is a rectangular glass plate having a long side in the right and left direction. The contact glass 8 is disposed in a horizontal posture.

The dividing member 9 is disposed on a left end portion of the contact glass 8. The dividing member 9 has a triangle pole shape extending along the entire length of the contact glass 8 in the front and rear direction. On the upper face of the contact glass 8 and on a right side of the dividing member 9, a document placing part 8A is formed. The document placing part 8A is formed from a right end of the dividing member 9 to a right end of the contact glass 8. The document placing part 8A is to support the document sheet thereon. Additionally, on the upper face of the contact glass 8 and a left side of the dividing member 9, a document contacting part 8B is formed. The document contacting part 8B is formed from a left end of the dividing member 9 to a left end of the contact glass 8. The dividing member 9 is disposed so as to contact with a left end of the document sheet placed on the document placing part 8A.

Figure 21:
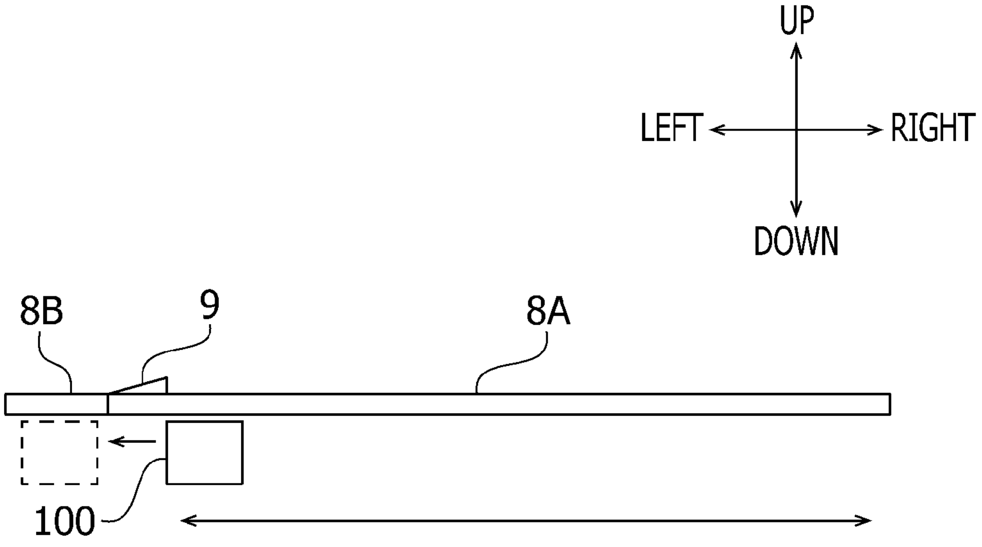
FIG. 21 is a cross-sectional side view showing a location of a CIS unit.

As shown in FIG. 21, the CIS unit 100 is disposed below the contact glass 8. The CIS unit 100 is movable in the right and left direction. The CIS unit 100 includes an LED (Light Emitting Diode), a lens, and an image sensor (not shown). The CIS unit 100 reads the image formed on the document sheet placed on the document placing part 8A.

The image reading device 3 can read the image formed on the document sheet using a flatbed scanner system.

In order to read the image with the flatbed scanner system, the ADF 7 is moved to the open position so as to expose the document placing part 8A. The document sheet is placed on the exposed document placing part 8A while a side on which the image to be read is formed faces the document placing part 8A. Then, the ADF 7 is moved to the close position. The CIS unit 100 emits light to the document sheet on the document placing part 8A while moving from a standby position to a right side at a constant speed. The light reflected by the document sheet is received by the image sensor and the image formed on the document is read.

Additionally, the image reading device 3 can read the image formed on the document sheet using an ADF system.

In order to read the image with the ADF system, the CIS unit 100 moves to below the document contacting part 8B and is set in the position. The ADF 7 is used for the ADF system. The document sheet is fed by the ADF 7 and a part of the document sheet on which the image is formed contacts the document contacting part 8B. At that time, The CIS unit 100 emits light to the document sheet contacting the document contacting part 8B. The light reflected by the document sheet is received by the image sensor and the image formed on the document is read.

<Operation Panel>

The MFP 1 includes an operation panel 10.

Figure 3:
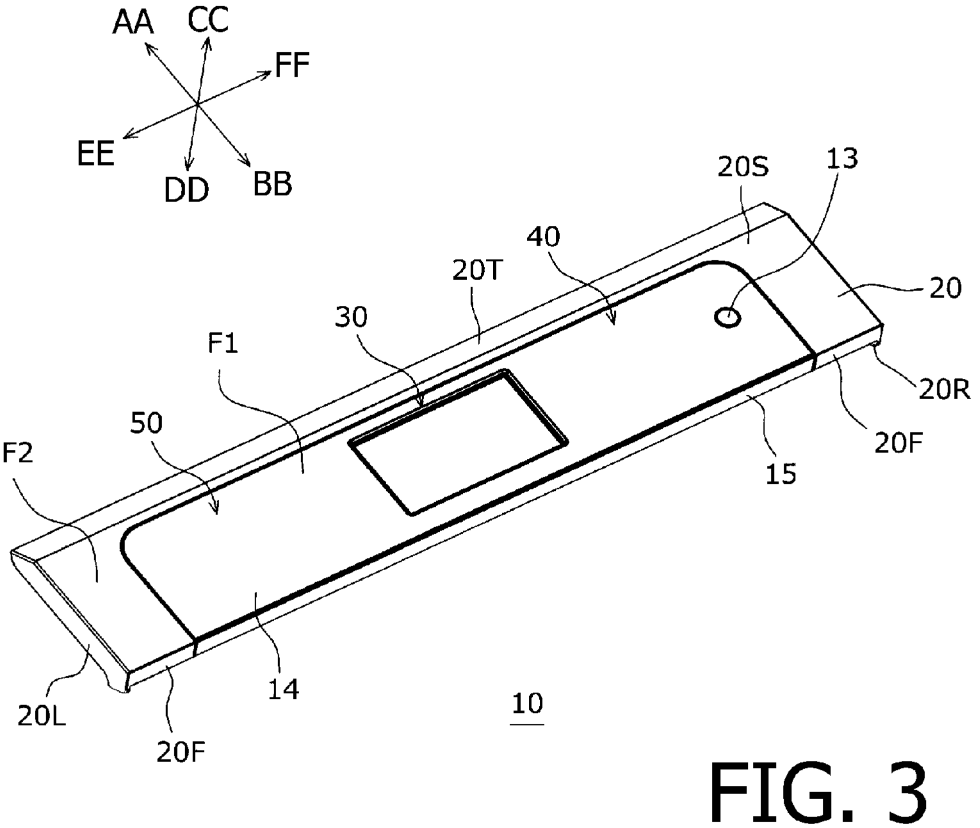
FIG. 3 is a perspective view showing the operation panel.

The operation panel 10 is disposed on a front end portion of the upper face of the device body 6 of the image reading device 3. The operation panel 10 is used for displaying and inputting information. The operation panel 10 is attached to the device body 6. As shown in FIGS. 1, 2 and 3, the operation panel 10 includes a touch panel unit 30, a touch key unit 40 and an NFC (Near Field Communication) unit 50.

The touch panel unit 30 is disposed on a central portion of the operation panel 10 in the right and left direction. The touch panel unit 30 is operated by a user for various settings. Additionally, the touch panel unit 30 displays information, such as the setting contents.

The touch key unit 40 is disposed on a right side of the touch panel unit 30 (i.e., on a right-end portion of the operation panel 10). The touch key unit 40 is also operated by the user for the various settings.

The NFC unit 50 is disposed on a left side of the touch panel unit 30 (i.e., on a left-end portion of the operation panel 10). The NFC unit 50 is used for a wireless communication with a non-contact IC card.

As shown in FIGS. 4, 5, 6 and 7, the operation panel 10 includes a panel cover 20, a panel plate 14, a panel front cover 15 and a first double-sided tape 16 which are commonly used in the touch panel unit 30, the touch key unit 40 and the NFC unit 50.

<Panel Cover>

Figure 8:
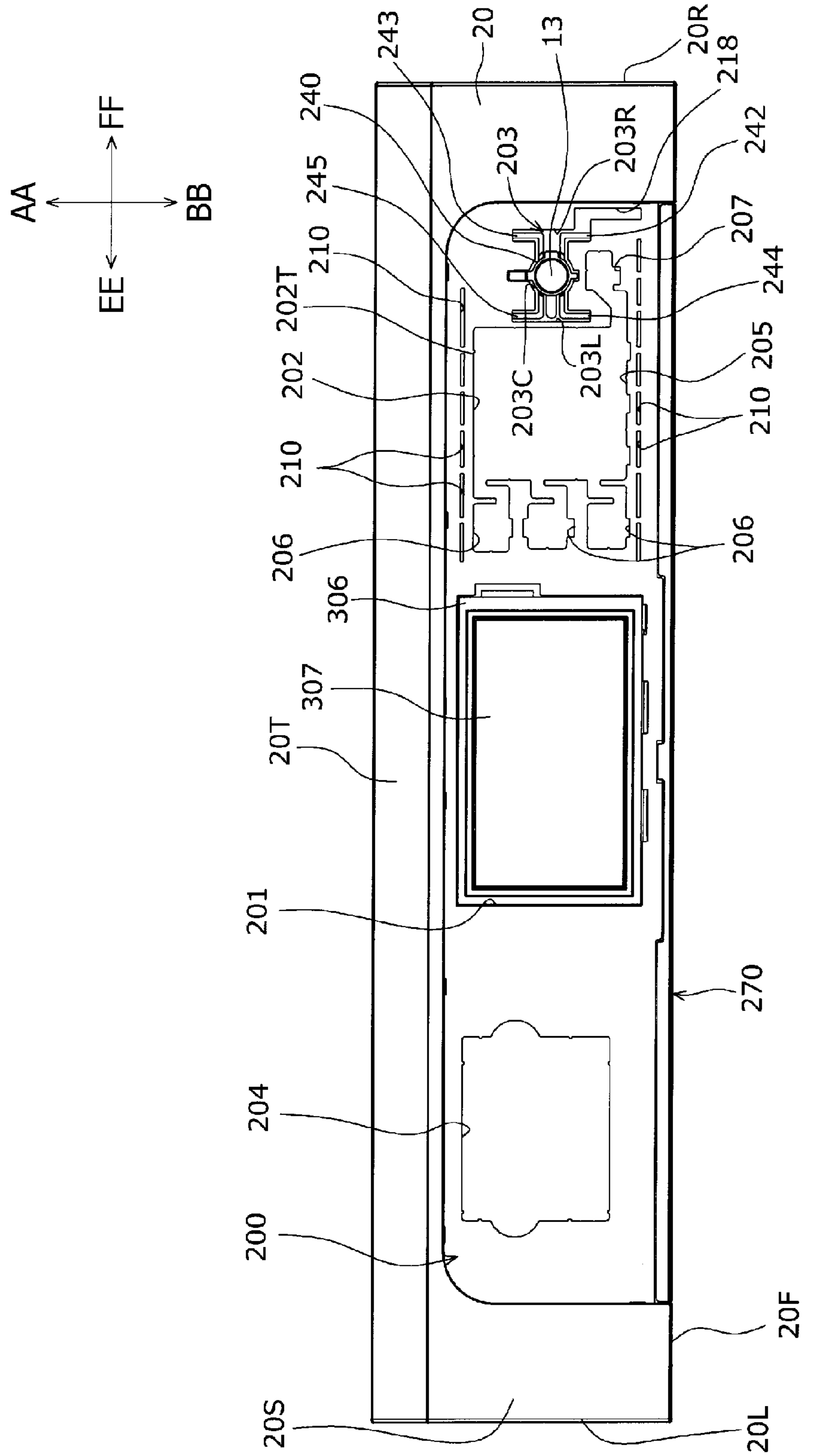
FIG. 8 is a plane view of the operation panel in a state where a panel plate is removed.
Figure 9:
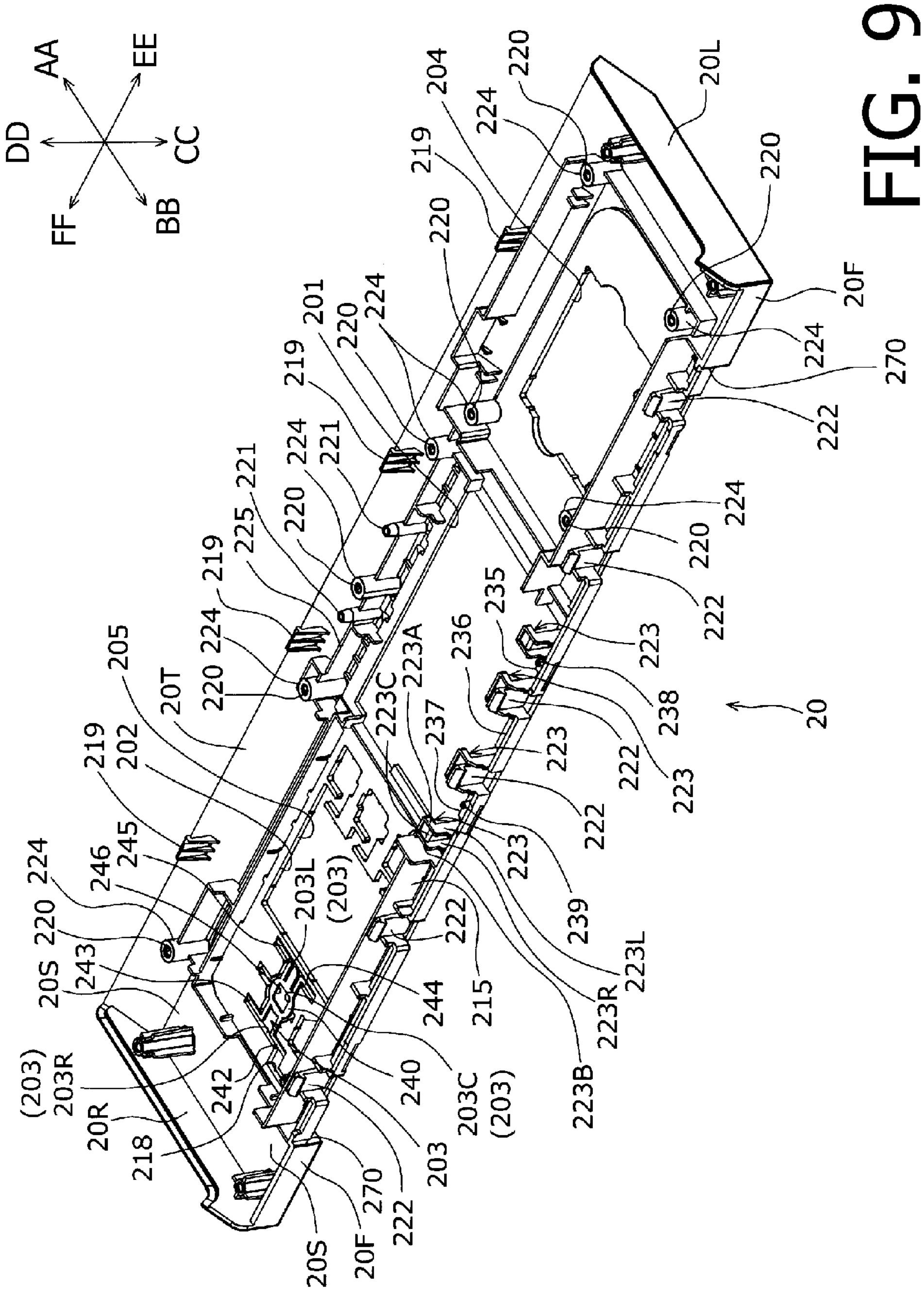
FIG. 9 is a perspective view showing an inner face of the panel cover.

As shown in FIGS. 8 and 9, the panel cover 20 has a rectangular shape having a long side in the right and left direction. The panel cover 20 is integrally formed with an upper part 20T, a main part 20S, a front part 20F, a left part 20L and a right part 20R. The upper part 20T has a plate-like shape extending horizontally. The main part 20S has a plate-like shape extending obliquely downward from a front edge of the upper part 20T. The front part 20F has a plate-like shape extending downward from a front edge of the main part 20S. The left part 20L has a plate-like shape connecting left edges of the upper part 20T, the main part 20S and the front part 20F.

The right part 20R has a plate-like shape connecting right edges of the upper part 20T, the main part 20S and the front part 20F.

Hereinafter, details of the operation panel 10 will be described with reference to FIGS. 3 through 19. It is noted that an AA and BB direction, a CC and DD direction and an EE and FF direction shown in FIG. 3 through 19 are used for explaining a direction and a position of the operation panel 10. Specifically, in a state where the operation panel 10 is attached to the device body 6, an AA side in FIGS. 3 through 19 corresponds to an upper rear side in FIGS. 1 and 2. A BB side in FIGS. 3 through 19 corresponds to a lower front side in FIGS. 1 and 2. A CC side in FIGS. 3 through 19 corresponds to an upper front side in FIGS. 1 and 2. A DD side in FIGS. 3 through 19 corresponds to a lower rear side in FIGS. 1 and 2. An EE side in FIGS. 3 through 19 corresponds to the left side in FIGS. 1 and 2. The FF side in FIGS. 3 through 19 corresponds to the right side in FIGS. 1 and 2.

<Upper Part>

The upper part 20T includes four locking parts 219 as shown in FIG. 9. The four locking parts 219 are disposed on a DD-side face of the upper part 20T (i.e., a rear face of the upper part 20T). The four locking parts 219 are disposed along an AA-side end of the upper part 20T with intervals therebetween in the EE and FF direction. The each locking part 219 is formed to project from the rear face of the upper part 20T toward the DD side. The each locking part 219 has a hook-like shape having an edge bent toward the AA side.

<Main Part>

Figure 4:
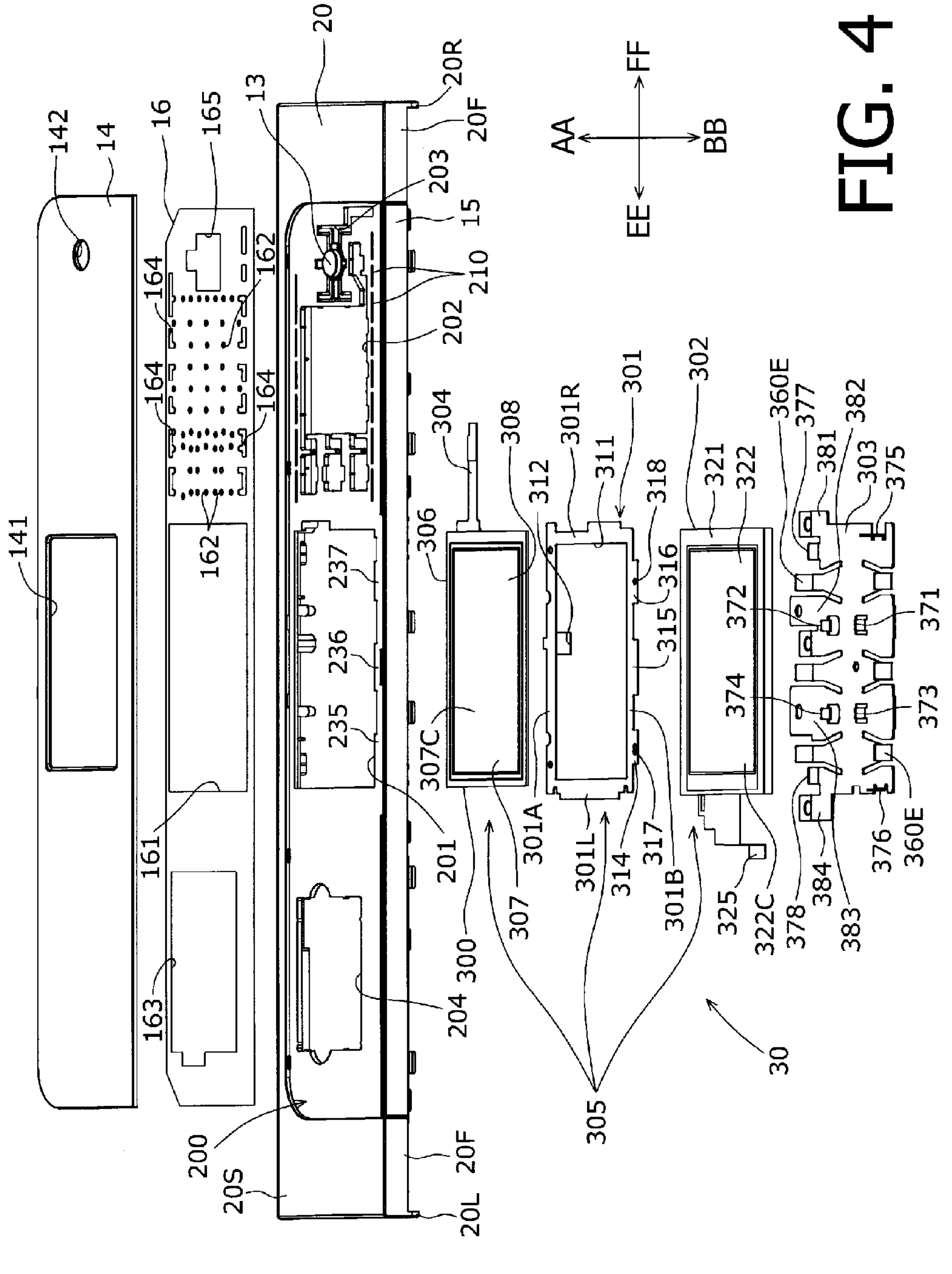
FIG. 4 is an exploded perspective view showing a touch panel unit of the operation panel viewed from a CC direction in FIG. 3.

The main part 20S has a frame part 200 as shown in FIG. 4. The frame part 200 has a rectangular shape extending in the EE and FF direction. The BB side and the CC side of the frame part 200 are opened. The frame part 200 has a depressed part depressed on the BB side on a central portion of the main part 20S. A face F2, which is a surface of the main part 20S on the CC side other than the frame part 200, is formed as a plane surface.

The frame part 200 has an LCD (Liquid Crystal Display) opening 201, a touch key opening 202, static electricity induction holes 210, a power switch opening 203, and an NFC opening 204.

The LCD opening 201 is formed on a central portion of the frame part 200 in the EE and FF direction. The LCD opening 201 has a substantially rectangular shape having a long side in the EE and FF direction.

The touch key opening 202 is formed on the FF side of the LCD opening 201 on the frame part 200 as shown in FIG. 8. The touch key opening 202 has a first touch key opening 205, three second touch key openings 206 and a third touch key opening 207.

The first touch key opening 205 has a substantially square shape.

The each second touch key opening 206 has a substantially square shape smaller than the first touch key opening 205. The three second touch key openings 206 are arranged in the AA and BB direction on the EE side of the first touch key opening 205.

The third touch key opening 207 has a substantially square shape smaller than the second touch key opening 206. The third touch key opening 207 is formed on the FF side of the first touch key opening 205 and on the BB side on the frame part 200.

Figure 15:
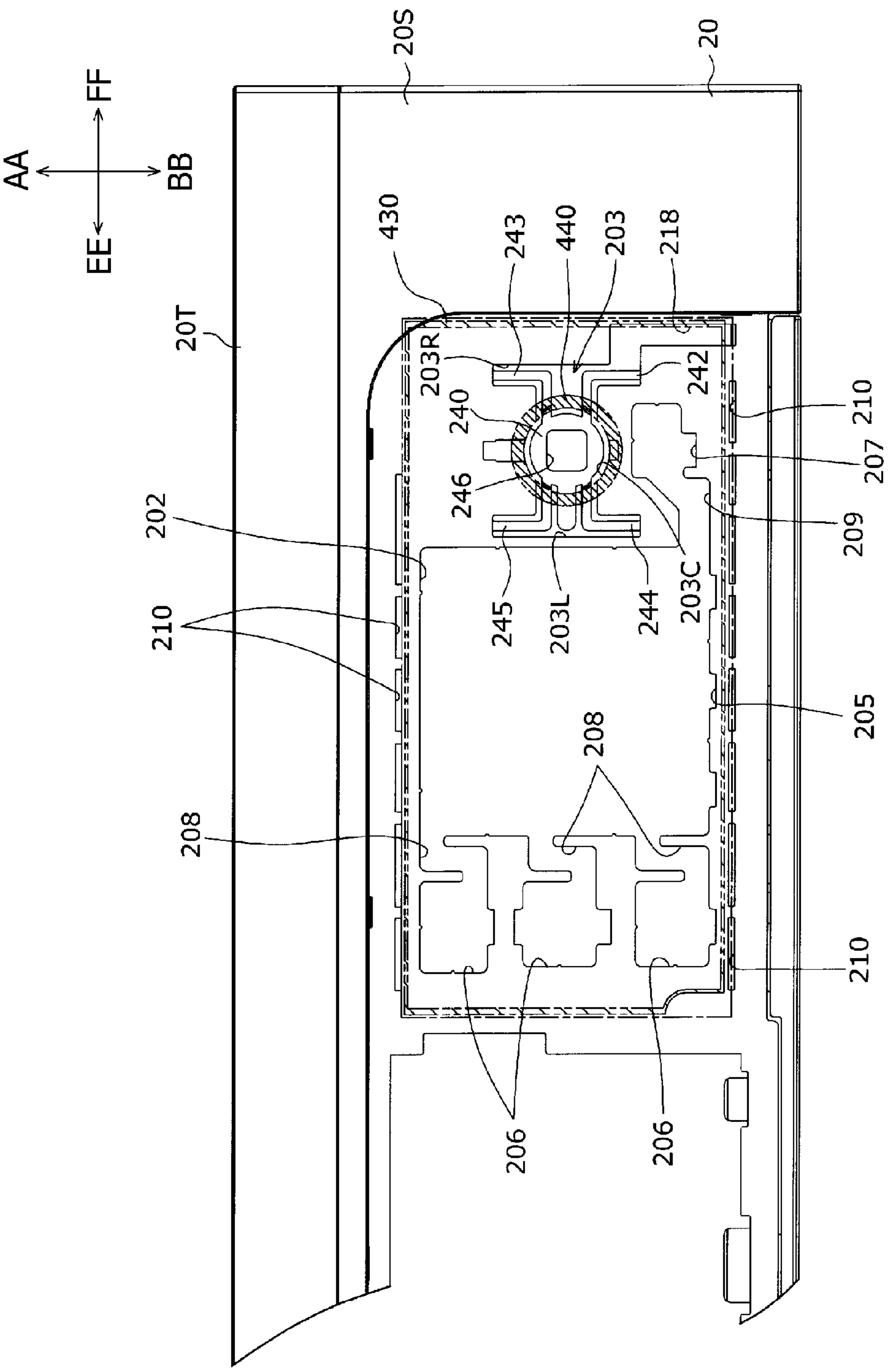
FIG. 15 shows an FF-side end portion of the panel cover viewed from the CC direction.

As shown in FIG. 15, the first touch key opening 205 communicates with the second touch key openings 206 via first connection openings 208. Additionally, the first touch key opening 205 communicates with the third touch key opening 207 via a second connection opening 209.

The static electricity induction holes 210 are formed on the AA side and the BB side of the touch key opening 202. The each static electricity induction hole 210 has an elongated shape having a long side in the EE and FF direction. The static electricity induction holes 210 are arranged on the AA side and the BB side of the touch key opening 202 with intervals therebetween in the EE and FF direction. The static electricity induction holes 210 are used for inducing static electricity.

The power switch opening 203 is formed on the AA side of the third touch key opening 207. The power switch opening 203 has a circular opening 203C and two T-shaped openings 203L and 203R. The T-shaped opening 203L is formed to extend from the circular opening 203C toward the EE side, and then, to diverge and further extend toward the AA side and the BB side. The T-shaped opening 203R is formed to extend from the circular opening 203C toward the FF side, and then, to diverge and further extend toward the AA side and the BB side.

A BB-side end of the T-shaped opening 203R communicates with an water passage 218. The water passage 218 is formed to extend from the edge of the T-shaped opening 203R on the FF side, and then, turn and further extend on the BB side.

The panel cover 20 includes a disk-shaped switch support 240. The switch support 240 is disposed within the circular opening 203C of the power switch opening 203. The switch support 240 is elastically supported by a first supporting part 242, a second supporting part 243, a third supporting part 244 and a fourth supporting part 245.

One end of the first supporting part 242 is connected with the switch support 240. The first supporting part 242 extends, within the T-shaped opening 203R, on the FF side, and then, turns and further extends on the BB side. The other end of the first supporting part 242 is connected with the BB-side end of the T-shaped opening 203R.

One end of the second supporting part 243 is connected with the switch support 240. The second supporting part 243 extends, within the T-shaped opening 203R, on the FF side, and then, turns and further extends on the AA side. The other end of the second supporting part 243 is connected with the AA-side end of the T-shaped opening 203R.

One end of the third supporting part 244 is connected with the switch support 240. The third supporting part 244 extends, within the T-shaped opening 203L, on the EE side, and then, turns and further extends on the BB side. The other end of the third supporting part 244 is connected with the BB-side end of the T-shaped opening 203L.

One end of the fourth supporting part 245 is connected with the switch support 240. The fourth supporting part 243 extends, within the T-shaped opening 203L, on the FF side, and then, turns and further extends on the AA side. The other end of the fourth supporting part 245 is connected with the AA-side end of the T-shaped opening 203L.

As shown in FIG. 9, a support opening 246 having a substantially square shape is formed on a central portion of the switch support 240.

Figure 6:
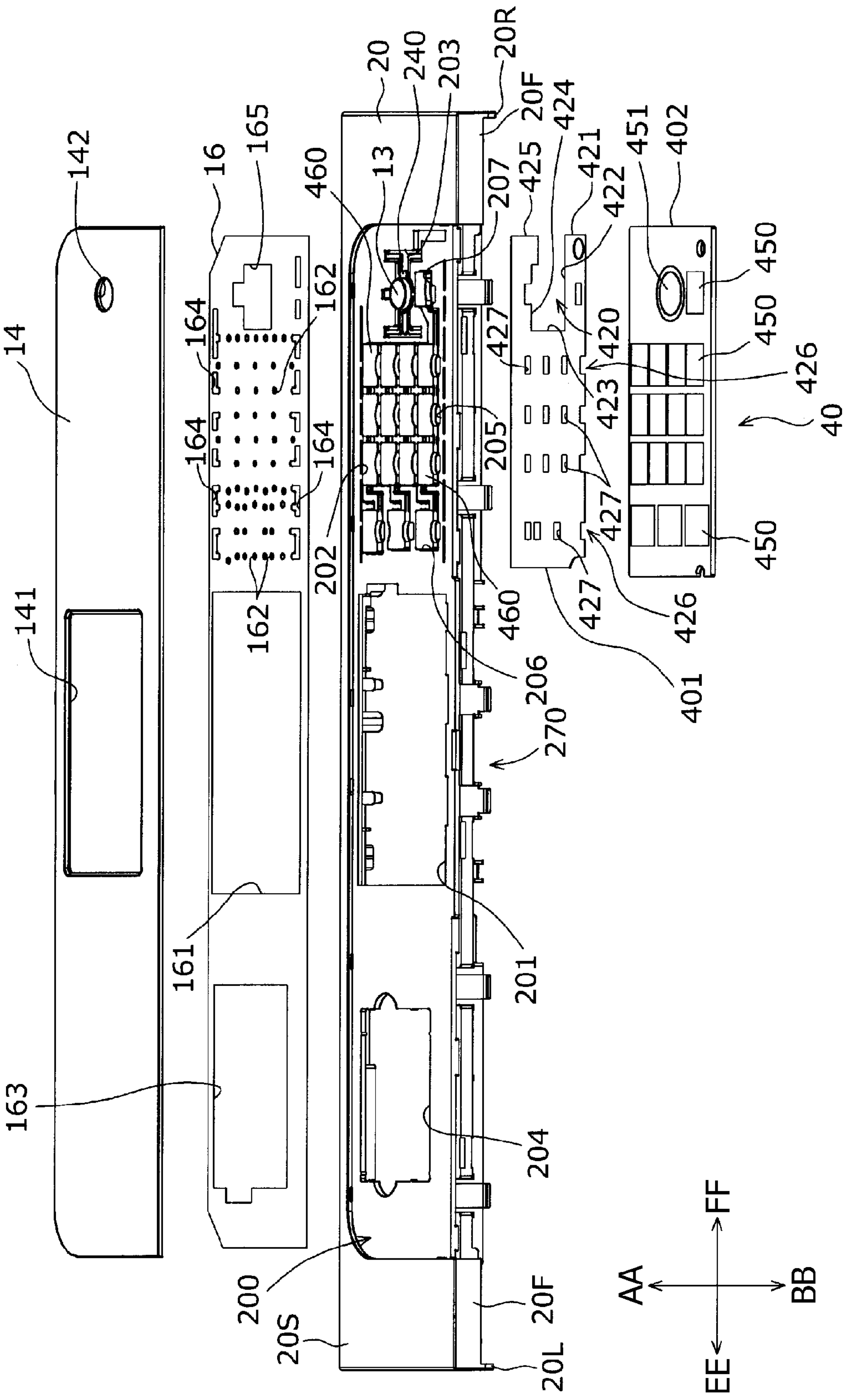
FIG. 6 is an exploded perspective view showing a touch key unit of the operation panel viewed from the CC direction in FIG. 3.
Figure 7:
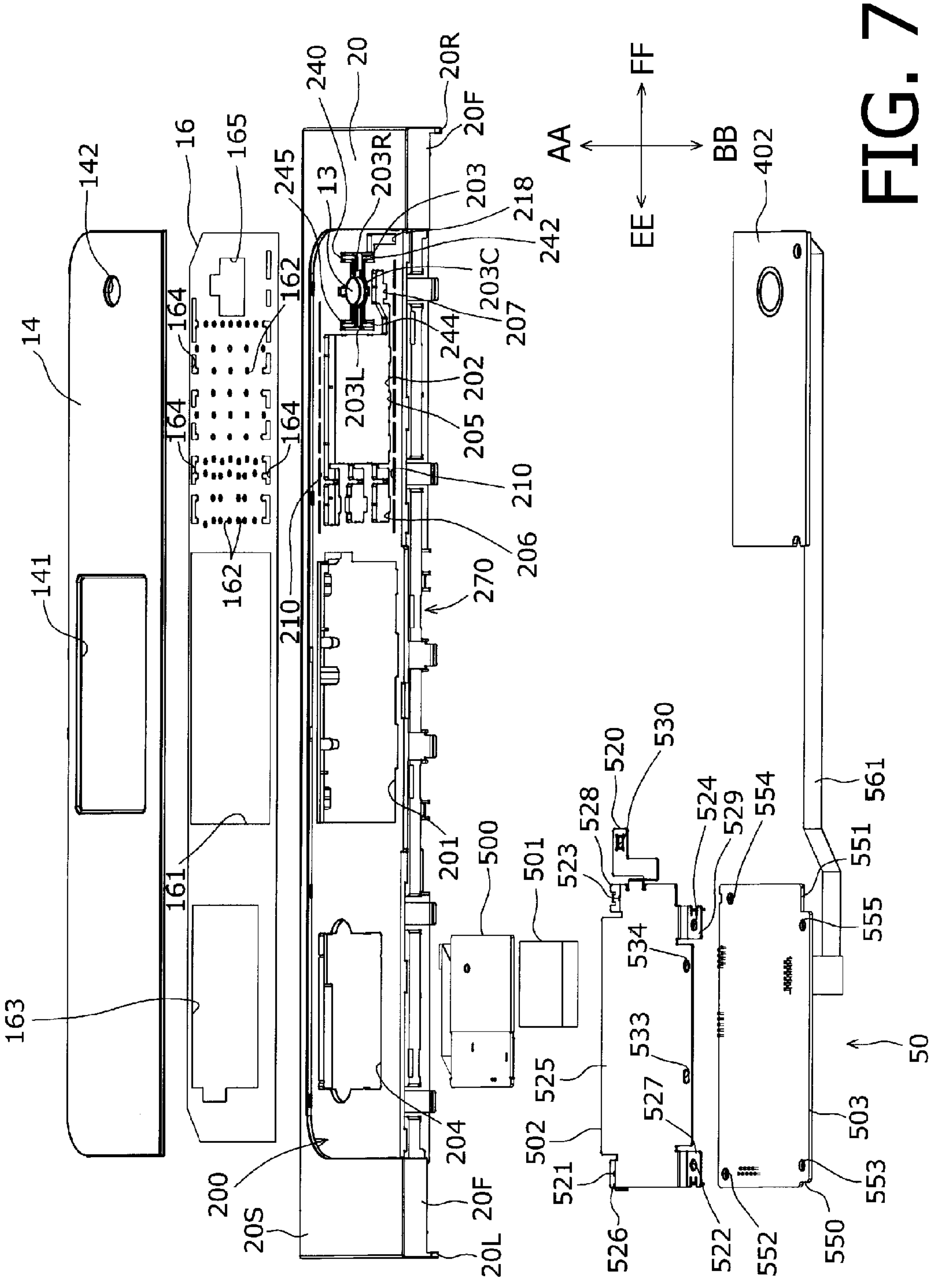
FIG. 7 is an exploded perspective view showing a NFC unit of the operation panel viewed from the CC direction in FIG. 3.

The switch support 240 supports a disk-like power switch 13 as shown in FIGS. 4, 6 and 7. The power switch 13 is, for example, a tactile switch. The power of the MFP 1 turns ON and OFF by pressing the power switch 13. A DD-side end portion of the power switch 13 is inserted into the support opening 246 so as to protrude from the switch support 240 toward the DD side.

The NFC opening 204 is formed on the EE side of the LCD opening 201 in the frame part 200. The NFC opening 204 has a substantially rectangular shape.

The main part 20S has six locking parts 222 as shown in FIG. 9. The six locking parts 222 are disposed on a DD-side face (i.e., a rear face of the main part 20S). The six locking parts 222 are arranged along a BB-side end of the main part 20S with intervals therebetween in the EE and FF direction. Specifically, two of the six locking parts 222 on a central portion in the EE and FF direction are dispose between the LCD opening 201 and the BB-side end of the main part 20S with an interval therebetween. The locking part 222 on the most EE-side is disposed between the BB-side end portion of the NFC opening 204 and the BB-side end of the main part 20S. The second locking part 222 from the EE-side end is disposed between the most EE-side locking part 222 and a third locking side part 22 from the EE-side end, with substantially the same intervals therebetween. The locking part 222 on the most FF-side is disposed between the third touch key opening 207 and the BB-side end of the main part 20S. The second locking part 222 from the FF-side end is disposed between the EE-side end portion of the first touch key opening 205 and the BB-side end of the main part 20S. The each locking part 222 is formed to project from the rear face of the main part 20S toward the DD side. The each locking part 222 has a hook-like shape having an edge bent toward the BB side.

The main part 20S has four first positioning parts 223. The four first positioning parts 223 are disposed on the rear face of the main part 20S. The four first positioning parts 223 are disposed between the LCD opening 201 and the BB-side end of the main part 20S with intervals therebetween in the EE and FF direction. The each first positioning part 223 is integrally formed with a pair of side parts 223L and 223R, extending parts 223A and 223B and a connecting part 223C. The pair of side parts 223L and 223R extend from the rear face of the main part 20S toward the DD side. The pair of side parts 223L and 223R face each other in the EE and FF direction across an interval. The side parts 223L and 223R of the two first positioning parts 223 on the central portion in the EE and FF direction are disposed to face across the locking part 222. The extending parts 223A and 223B respectively extend from upper edges of the side parts 223L and 223R toward the AA-side. The connecting part 223C extends in the EE and FF direction to connect the extending part 223A with the extending part 223B.

Figure 5:
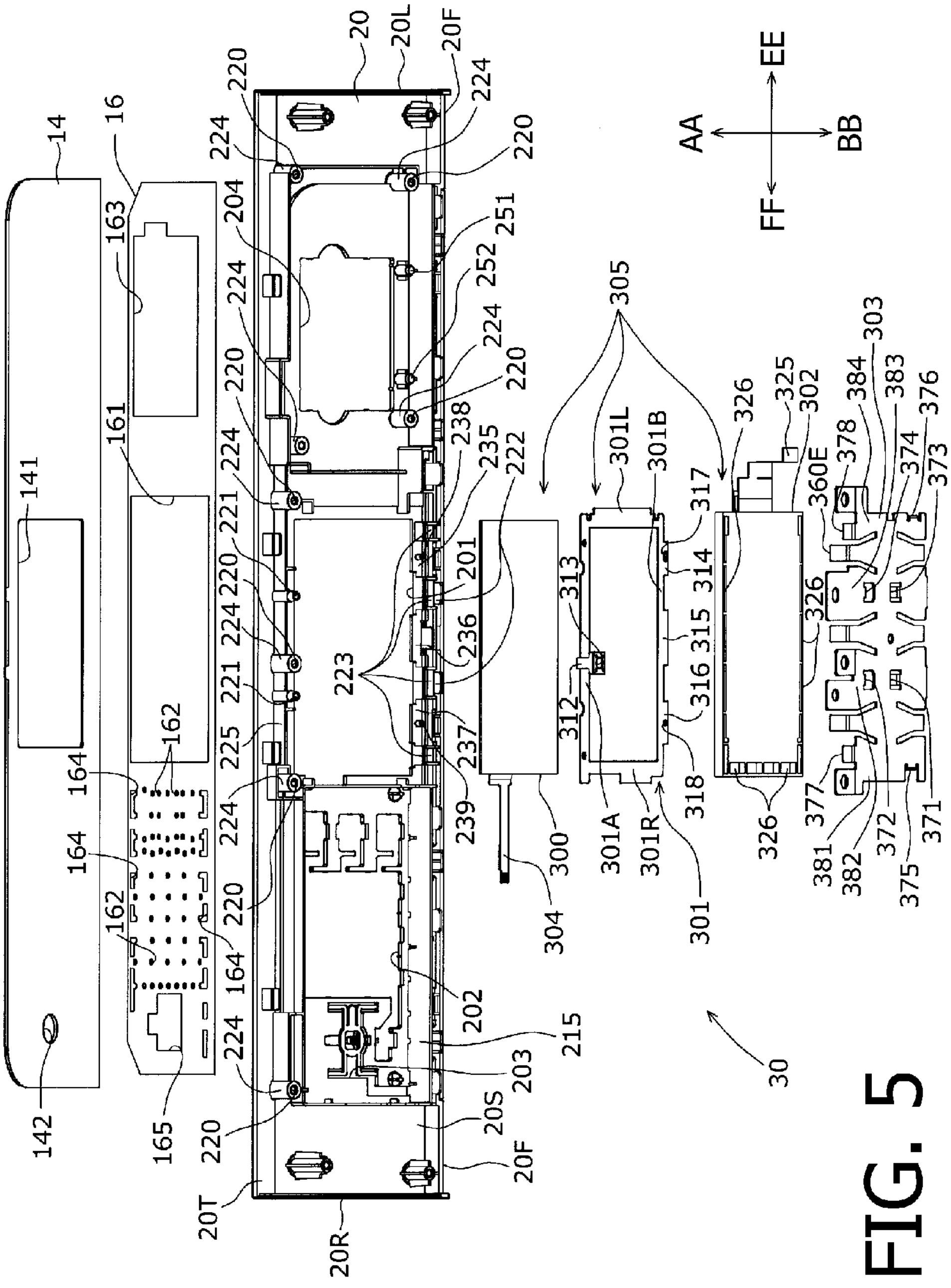
FIG. 5 is an exploded perspective view showing the touch panel unit viewed from a DD direction in FIG. 3.

The main part 20S has flat positioning parts 235, 236 and 237 on the rear face as shown in FIG. 5. The positioning parts 235, 236 and 237 are disposed between the each first positioning part 223. On the flat faces of the positioning parts 235 and 237, bosses 238 and 239 are formed to project toward the DD side, respectively. The positioning parts 235, 236 and 237 face a display unit 305 as shown in FIG. 5.

The main part 20S has two projection parts 221 as shown in FIGS. 5 and 9. The two projection parts 221 are disposed on the rear face of the main part 20S. The two projection parts 221 are disposed on the AA side of the LCD opening 201 at a position facing the two first positioning parts 223 on the central portion in the AA and BB direction. The each projection part 221 has a substantially cylindrical shape projecting from the rear face of the LCD opening 201 toward the DD side.

The main part 20S has eight threaded bosses 224. The eight threaded bosses 224 are disposed on the rear face of the main part 20S. The six of the eight threaded bosses 224 are arranged on the AA-side end portion of the rear dace of the main part 20S with intervals therebetween in the EE and FF direction. The other two of the eight threaded bosses 224 are arranged on the BB-side and the EE-side end portion of the rear face of the main part 20S with intervals therebetween in the EE and FF direction. The each threaded boss 224 has a cylindrical shape projecting from the rear face of the LCD opening 201 toward the DD side. The each threaded boss 224 has a screw hole 220 opening on the DD side.

The main part 20S has two protrusion parts 251 and 252. The two protrusion parts 251 and 252 are arranged between the two threaded bosses 224 on the BB side at an interval therebetween in the EE and FF direction. Specifically, the two threaded bosses 224 are arranged along the BB-side end of the NFC opening 204. Each of the protrusion parts 251 and 252 has a substantially cylindrical shape projecting from the rear face of the main part 20S toward the DD side.

The main part 20S has a stiffening rib 215 extending along the EE and FF direction and projecting from the rear face of the main part 20S as shown in FIG. 9. The stiffening rib 215 is disposed on an opposite side of the touch key opening 202 with respect to the static electricity induction holes 210 formed on the BB side of the touch key opening 202 (i.e., on the BB side of the static electricity induction holes 210 formed on the BB side of the touch key opening 202).

<Front Part>

The front part 20F has a depressed part 270. The depressed part 270 is formed on a central portion of the front part 20F in the EE and FF direction. The depressed part 270 extends between the most EE-side threaded boss 224 and the most FF-side threaded boss 224. The depressed part 270 is formed to be depressed on the AA-side with respect to the EE-side end and the FF-side end of the front part 20F and opens on the CC side and the DD side.

<Panel Plate>

The panel plate 14 is made of resin. The panel plate 14 has a rectangular plate-like shape extending in the EE and FF direction. A shape of the panel plate 14 is substantially the same as the frame part 200 of the main part 20S of the panel cover 20 when viewed from the CC and DD direction. Additionally, a thickness of the panel plate 14 is the same as a depth of the frame part 200 in the CC and DD direction. The panel plate 14 is fitted in the frame part 200 so as to be supported. In a state where the panel plate 14 is fitted in the frame part 200, a surface F1, which is a CC-side surface of the panel plate 14, and the surface F2 are on the same plane.

The panel plate 14 has a rectangular opening 141 and a circular opening 142.

The rectangular opening 141 is formed on the central portion of the panel plate 14 in the EE and FF direction. The rectangular opening 141 extends in the EE and FF direction and is smaller than the LCD opening 201 of the panel cover 20. The position of the rectangular opening 141 corresponds to the position of the LCD opening 201 in the CC and DD direction when the panel plate 14 is fitted in the frame part 200.

The circular opening 142 is formed on the FF-side end portion of the panel plate 14. The circular opening 142 is slightly larger than the power switch 13 in a radial direction. The power switch 13 is fitted in the circular opening 142 when the panel plate 14 is fitted in the frame part 200.

<Panel Front Cover>

The panel front cover 15 has a plate-like shape extending in the EE and FF direction as shown in FIG. 4. A shape of the panel front cover 15 is substantially the same as the depressed part 270 of the front part 20F of the panel cover 20 when viewed from the AA and BB direction. Additionally, a thickness of the panel front cover 15 is substantially the same as a depth of the depressed part 270 in the AA and BB direction. The panel front cover 15 is fitted in the depressed part 270. In a state where the panel front cover 15 is fitted in the depressed part 270, the BB-side surface of the panel front cover 15 and the BB-side surface of the front part 20F of the panel cover 20 are on the same plane. Additionally, the CC-side end face of the panel front cover 15 and the DD-side surface of the main part 20S of the panel cover 20 are on the same plane.

<First Double-Sided Tape>

The first double-sided tape 16 is disposed between the panel plate 14 and the panel cover 20. The first double-sided tape 16 has a polyester non-woven fabric and adhesives formed on the both side of the non-woven fabric. The first double-sided tape 16 has a substantially rectangular shape extending in the EE and FF direction. The first double-sided tape 16 has a first opening 161, second openings 162, a third opening 163, fourth openings 164 and a fifth opening 165

The first opening 161 is formed on a central portion of the first double-sided tape 16 in the EE and FF direction. A shape of the first opening 161 is substantially the same as the LCD opening 201 of the main part 20S of the panel cover 20. The position of the first opening 161 corresponds to the positions of the LCD opening 201 of the panel cover 20 and the rectangular opening 141 of the panel plate 14 in the CC and DD direction.

A plurality of the second openings 162 are formed on the FF-side of the first opening 161. The each second opening 162 has a circular shape. The second openings 162 face the first touch key opening 205 and the second touch key openings 206 of the main part 20S of the panel cover 20 in the CC and DD direction.

The third opening 163 is formed on the EE side of the first opening 161. The third opening 163 has a rectangular shape of which length in the EE and FF direction is longer than that of the NFC opening 204 of the main part 20S of the panel cover 20. The position of the third opening 163 corresponds to the position of the NFC opening 204 in the CC and DD direction.

A plurality of the fourth openings 164 are formed on the AA side and the BB side of the second openings 162. The each fourth opening 164 has an elongated shape extending in the EE and FF direction. The fourth openings 164 are arranged in the EE and FF direction with intervals therebetween, respectively on the AA side and the BB side of the second openings 162. The position of the fourth openings 164 corresponds to the position of the static electricity induction holes 210 of the main part 20S of the panel cover 20 in the CC and DD direction.

The fifth opening 165 is formed on the FF side of the second openings 162. The power switch 13 is inserted in the fifth opening 165.

<Touch Panel Unit>

As shown in FIGS. 4 and 5, the touch panel unit 30 includes a touch panel 300, a support frame 301, a display unit 305 having an LCD (Liquid Crystal Display) 302, and an urging member 303.

<Touch Panel>

The touch panel 300 has a rectangular shape having a long side in the EE and FF direction. The touch panel 300 has a rectangular touch panel frame part 306 and an operation part 307 disposed within the touch panel frame part 306. An operation surface 307C on the CC side of the operation part 307 (i.e., an opposite side of the LCD 302) is a surface operated by the user with his/her finger. The touch panel 300 is a resistive type or surface elastic wave type touch panel in which a signal is outputted based on a change of pressure on the operation surface 307C made by the user's finger. The output signal of the touch panel 300 is inputted to a touch panel control substrate (not shown) through a touch panel cable 30 connected with the touch panel frame part 306. The touch panel 300 is disposed on the panel cover 20 side with respect to the LCD 302 as shown in FIG. 4. The touch panel 300 transmits an image displayed on the LCD 302.

Figure 10:
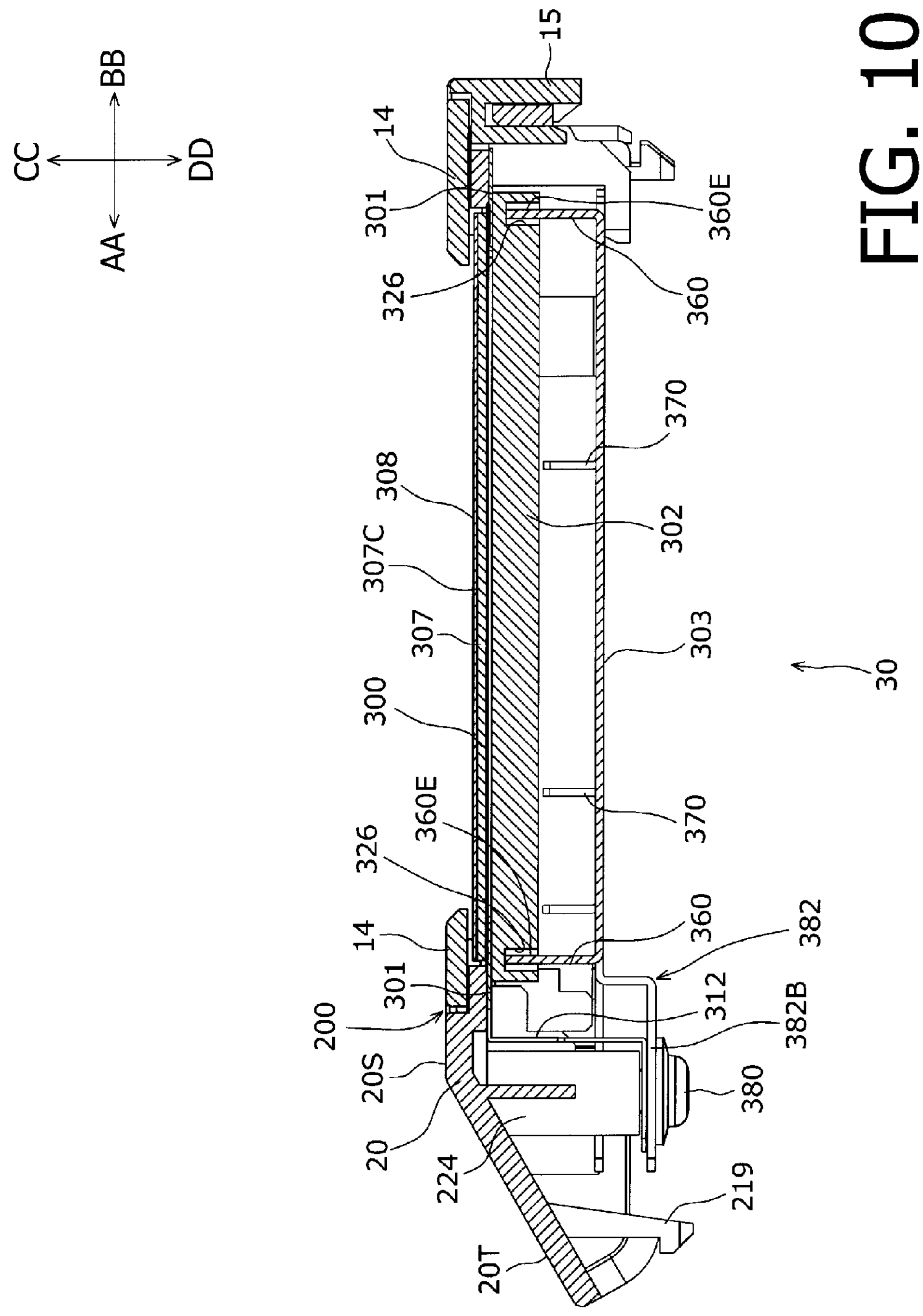
FIG. 10 is a cross-sectional side view schematically showing the touch panel unit.

The operation surface 307C of the touch panel 300 is exposed from the LCD opening 201. The operation surface 307C of the touch panel 300 is covered by a protection film 308 as shown in FIG. 10.

<Support Frame>

The support frame 301 supports the touch panel 300. The support frame 301 is made of a sheet metal. The support frame 301 has a rectangular fame shape as shown in FIGS. 4 and 5. The support frame 301 is integrally formed with a first frame part 301A, a second frame part 301B, a third frame part 301L and a fourth frame part 301R. The first frame part 301A and the second frame part 301B extend in the EE and FF direction and face each other across an opening in the AA and BB direction. The first frame part 301A is disposed on the AA side of the second frame part 301B. The third frame part 301L extends in the AA and BB direction. The third frame part 301L is connected with the EE-side end of the first frame part 301A and the EE-side end of the second frame part 301B. The fourth frame part 301R extends in the AA and BB direction. The fourth frame part 301R is connected with the FF-side end of the first frame part 301A and the FF-side end of the second frame part 301B.

The support frame 301 includes an L-shaped part 312. The L-shaped part 312 is disposed slightly on the FF side of the central portion of the first frame part 301A in the EE and FF direction. The L-shaped part 312 extends from the first frame part 301A toward the DD side, and then, turns and further extends on the AA side as shown in FIG. 10. As shown in FIG. 5, a through hole 313 is formed on an end portion of the L-shaped part 312.

The support frame 301 has three positioning parts 314, 315 and 316. The positioning part 314 has a rectangular shape projecting from the EE-side end portion of the second frame part 301B toward the BB side and extending in the EE and FF direction. The positioning part 315 has a rectangular shape projecting from the central portion of the second frame part 301B in the EE and FF direction toward the BB side and extending in the EE and FF direction. The positioning part 316 has a rectangular shape projecting from the FF-side end portion of the second frame part 301B toward the BB side and extending in the EE and FF direction. The positioning parts 314 and 316 have through holes 317 and 318, respectively. The through hole 317 is a long hole having a long side in the EE and FF direction. A short radius of the through hole 317 is substantially the same as a radius of the boss 238 of the main part 20S of the panel cover 20 shown in FIG. 5. The through hole 318 has a circular shape. A radius of the through hole 318 is substantially the same as a radius of the boss 239 of the main part 20S of the panel cover 20 shown in FIG. 5.

<LCD>

The LCD 302 has a rectangular shape of which size is the substantially the same as that of the touch panel 300 viewed from the CC and DD direction. The LCD 302 has a rectangular LCD frame part 321 and an image display part 322 disposed within the LCD frame part 321. The image display part 322 has a display surface 322C on the CC side on which an image, such as keys, is displayed. The LCD 302 is configured to display the image.

The LCD 302 includes an LCD cable 325. One end of the LCD cable 325 is connected with the LCD frame part 321. The other end of the LCD cable 325 is connected with the touch panel control substrate (not shown). Image data to be displayed on the display surface 322C of the LCD 302 is inputted to the LCD 302 from the touch panel control substrate through the LCD cable 325.

Figure 11:
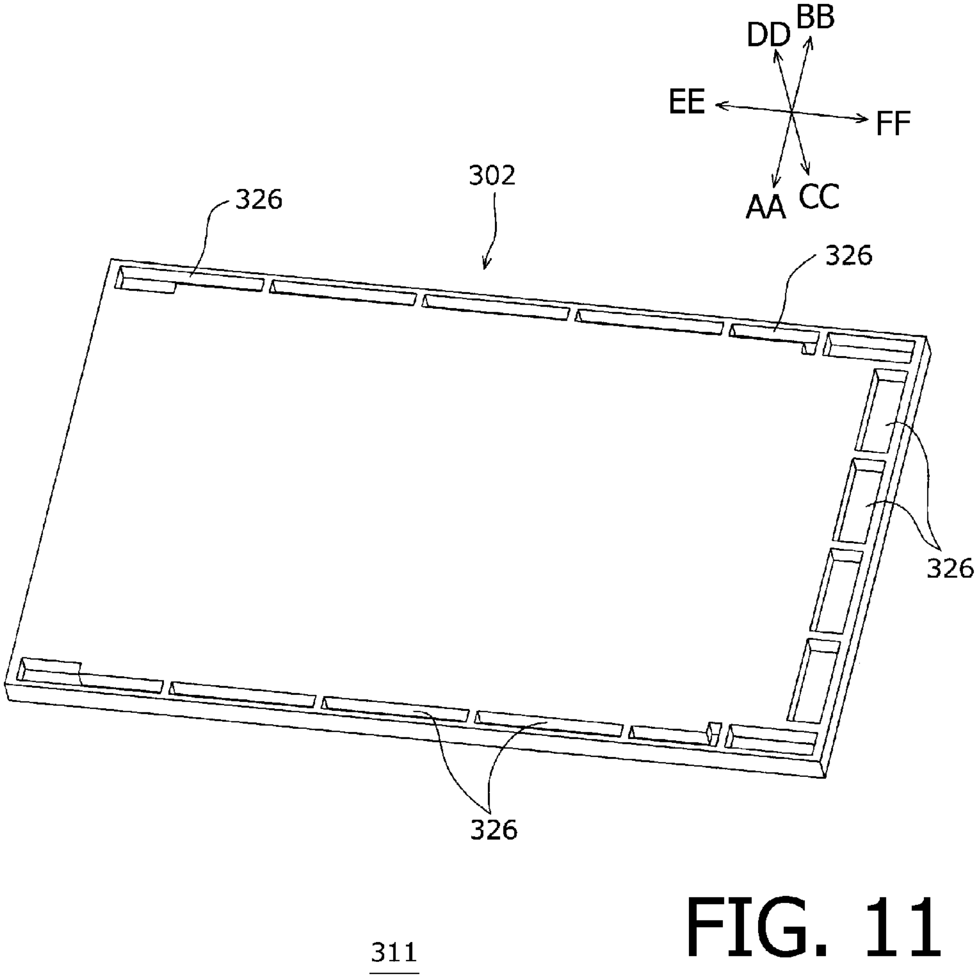
FIG. 11 is a perspective view showing a rear face of an LCD.

The LCD 302 has a plurality of rectangular depressed parts 326 formed on a peripheral portion of its rear face (i.e., the DD-side face) as shown in FIGS. 5 and 11. Specifically, the depressed parts 326 are formed on the AA-side, BB-side and FF-side peripherals on the rear face of the LCD 302 with intervals therebetween.

<Urging Member>

Figure 12:
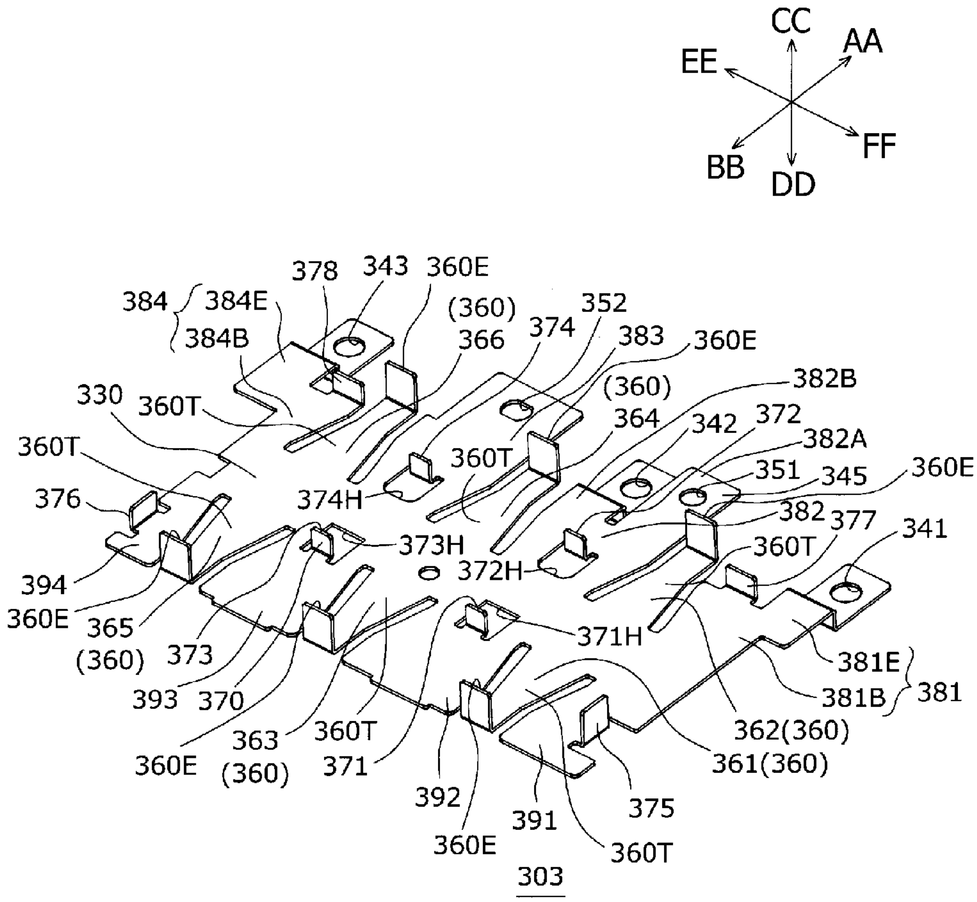
FIG. 12 is a perspective view showing an urging member.
Figure 13:
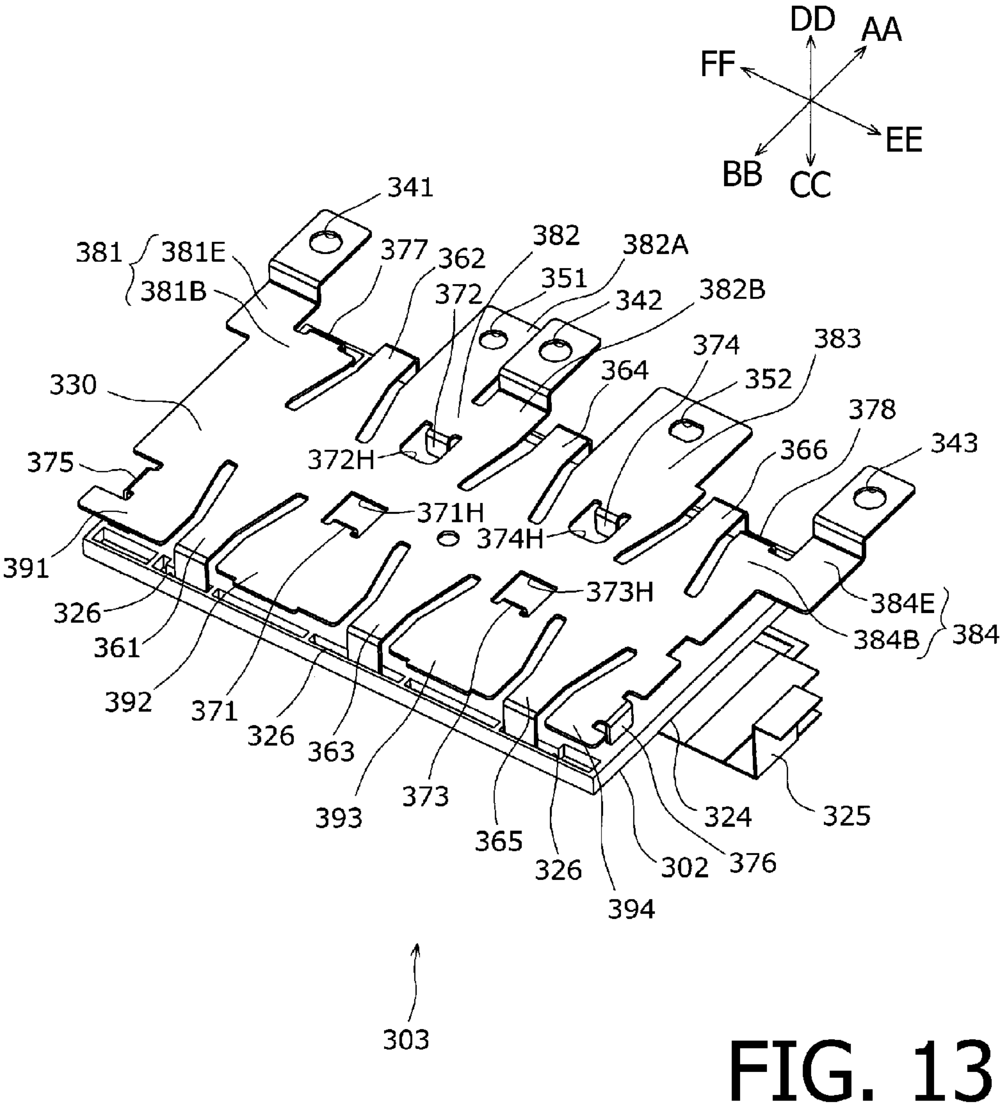
FIG. 13 is a perspective view showing the urging member in a state where it contacts with the rear face of the LCD.

The urging member 303 is made of a sheet metal. As shown in FIGS. 12 and 13, the urging member 303 has a plate part 330 and six extending parts 360 formed integrally.

The plate part 330 has a rectangular shape. The plate part 330 is disposed on a side, on which a rear face of the operation surface 307C of the display unit 305 is disposed, at an interval therebetween.

The six extending parts 360 extend from three positions on the plate part 330 distanced in the EE and FF direction to both of the AA side and the BB side. A base part 360T of the each extending part 360 has a trapezoidal shape having a broader width on the plate part 330 side viewed from the CC and DD direction. That is, the width of the base part 360T is broader than the width of an end part 360E in the EE and FF direction. The end part 360E of the each extending part 360 is bent to the CC side.

Hereinafter, upon specifying each extending part 360, the extending part 360 formed on the BB side and the FF side of the plate part 330 is referred to as a "first extending part 361." The extending part 360 formed on the AA side and the FF side of the plate part 330 is referred to as a "second extending part 362." The extending part 360 formed on the BB side and a central portion of the plate part 330 in the EE and FF direction is referred to as a "third extending part 363." The extending part 360 formed on the AA side and the central portion of the plate part 330 in the EE and FF direction is referred to as a "fourth extending part 364." The extending part 360 formed on the BB side and the EE side of the plate part 330 is referred to as a "fifth extending part 365." The extending part 360 formed on the AA side and the EE side of the plate part 330 is referred to as a "sixth extending part 366."

The urging member 303 has a first locking plate part 391 on the FF side of the first extending part 361. The first locking plate part 391 is integrally formed with the plate part 330. The first locking plate part 391 extends on the BB side from the plate part 330.

The urging member 303 has a second locking plate part 392 between the first extending part 361 and the third extending part 363. The second locking plate part 392 is integrally formed with the plate part 330. The second locking plate part 392 extends on the BB side from the plate part 330. A rectangular opening 371H is formed on a boundary of the plate part 330 and the second locking plate part 392.

The urging member 303 has a third locking plate part 393 between the third extending part 363 and the fifth extending part 365. The third locking plate part 393 is integrally formed with the plate part 330. The third locking plate part 393 extends on the BB side from the plate part 330. A rectangular opening 373H is formed on a boundary of the plate part 330 and the third locking plate part 393.

The urging member 303 has a fourth locking plate part 394 on the EE side of the fifth extending part 365. The fourth locking plate part 394 is integrally formed with the plate part 330. The fourth locking plate part 394 extends on the BB side from the plate part 330.

The urging member 303 has a first fixing plate part 381 on the FF side of the second extending part 362. The first fixing plate part 381 is integrally formed with the plate part 330. The first fixing plate part 381 extends on the AA side from the plate part 330. The first fixing plate part 381 has a base part 381B and an extending part 381E formed integrally. The base part 381B has a substantially rectangular shape. The extending part 381E extends from the FF-side end of the base part 381B on the AA side. An intermediate portion of the extending part 381E turns and extends on the DD side, and an AA side end portion of the extending part 381E further turns and extends on the AA side. The extending part 381E has a through hole 341 on the end portion.

Figure 14:
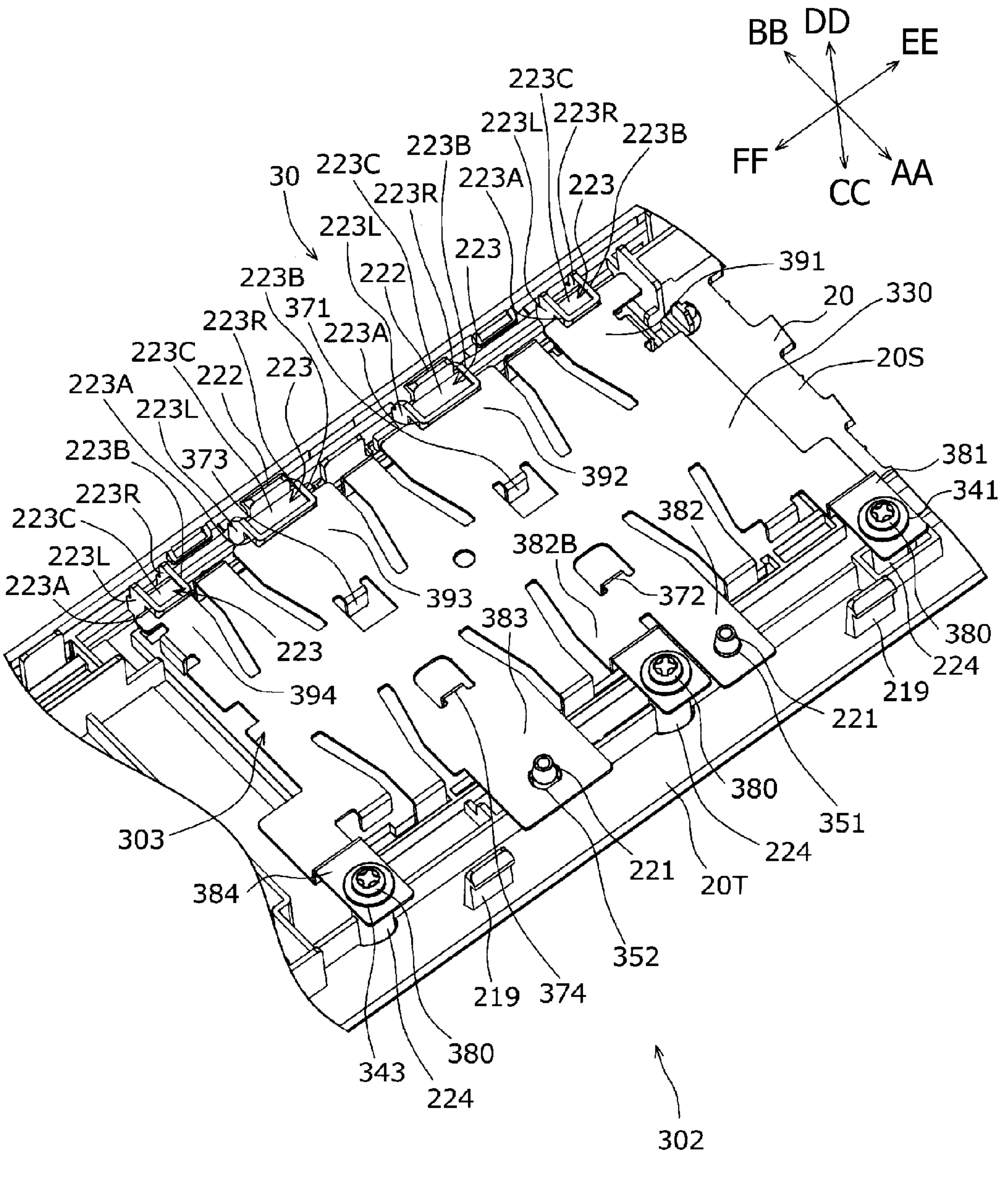
FIG. 14 is a perspective view showing an inside of the touch panel unit.

The urging member 303 has a first positioning plate part 382 between the second extending part 362 and the fourth extending part 364. The first positioning plate part 382 is integrally formed with the plate part 330. The first positioning plate part 382 extends on the AA side from the plate part 330. An AA-side end portion of the first positioning plate part 382 is separated to a first separating part 382A and a second separating part 382B. The first separating part 382A has a positioning hole 351 on the end portion. The second separating part 382B has a through hole 324 on the end portion. The first positioning plate part 382 has a rectangular opening 372H. The first positioning plate part 382 is locked in the panel cover 20 as shown in FIG. 14.

The urging member 303 has a second positioning plate part 383 between the fourth extending part 364 and the sixth extending part 366. The second positioning plate part 383 is integrally formed with the plate part 330. The second positioning plate part 383 extends on the AA side from the plate part 330. The second positioning plate part 383 has a positioning hole 352 on the end portion. The second positioning plate part 383 has a rectangular opening 374H. The second positioning plate part 383 is locked in the panel cover 20 as shown in FIG. 14.

The urging member 303 has a second fixing plate part 384 on the EE side of the sixth extending part 366. The second fixing plate part 384 is integrally formed with the plate part 330. The second fixing plate part 384 extends on the AA side from the plate part 330. The second fixing plate part 384 has a base part 384B and an extending part 384E formed integrally. The base part 384B has a substantially trapezoidal shape. The extending part 384E extends from the EE-side end of the base part 384B on the AA side. An intermediate portion of the extending part 384E turns and further extends on the DD side, and an AA side end portion of the extending part 384E further turns and further extends on the AA side. The extending part 384E has a through hole 343 on the end portion. As shown in FIG. 14, screws 380 are inserted through the first fixing plate part 381 and the second fixing plate part 384 to be fastened.

The urging member 303 has four central contacting parts 371, 372, 373 and 374. The central contacting part 371 extends from the BB-side end of the opening 371H on the CC side. The central contacting part 372 extends from the AA-side end of the opening 372H on the CC side. The central contacting part 373 extends from the BB-side end of the opening 373H on the CC side. The central contacting part 374 extends from the AA-side end of the opening 374H on the CC side. The four central contacting parts 371, 372, 373 and 374 are integrally formed with the plate part 330. The four central contacting parts 371, 372, 373 and 374 are disposed to face the central portion of the rear face of the display unit 305.

The urging member 303 has four peripheral contacting parts 375, 376, 377 and 378. The peripheral contacting part 375 extends from the FF-side end of the first locking plate part 391 on the CC side. The peripheral contacting part 376 extends from the EE-side end of the fourth locking plate part 394 on the CC side. The peripheral contacting part 377 extends from the AA-side end of the base part 381B of the first fixing plate part 381 on the CC side. The peripheral contacting part 378 extends from the AA-side end of the base part 384B of the second fixing plate part 384 on the CC side. The four peripheral contacting parts 375, 376, 377 and 378 are integrally formed with the plate part 330. The four peripheral contacting parts 375, 376, 377 and 378 are disposed to face the peripheral portion of the rear face of the display unit 305.

<Assembly of the Touch Panel Unit>

As shown in FIG. 10, the touch panel 300 is disposed between the main part 20S of the panel cover 20 and the support frame 301. The CC-side face of the support frame 301 contacts the DD-side face of the touch panel frame part 306 of the touch panel 300. At this time, the positioning parts 314, 315 and 316 of the support frame 301 contact the positioning parts 235, 236 and 237 of the panel cover 20, respectively. Additionally, the bosses 238 and 239 formed on the positioning parts 235 and 237 of the panel cover 20 are inserted in the through holes 317 and 318 formed on the positioning parts 314 and 316 of the support frame 301, respectively.

The end portion of the L-shaped part 312 of the support frame 301 contacts the threaded boss 224 formed between the two projecting parts 221 on the main part 20S of the panel cover 20 from the DD side. Then, the position of the through hole 313 formed on the L-shaped part 312 corresponds to the position of the screw hole 220 of the threaded boss 224.

The LCD 302 is disposed on the DD side of the support frame 301. The LCD frame part 321 of the LCD 302 contacts the DD-side face of the support frame 301.

The urging member 303 is disposed on the DD side of the LCD 302. As shown in FIG. 14, the first locking plate part 391, the second locking plate part 392, the third locking plate part 393 and the fourth locking plate part 394 respectively contact the side parts 223L and 223R of the first positioning parts 223 of the main part 20S of the panel cover 20 from the AA side. In this state, the extending parts 223A and 223B and the connecting part 223C of the first positioning parts 223 face the first locking plate part 391, the second locking plate part 392, the third locking plate part 393 and the fourth locking plate part 394 from the DD side.

The projecting parts 221 of the main part 20S of the panel cover 20 are inserted in the positioning hole 351 formed on the first positioning plate part 382 and the positioning hole 352 formed on the second positioning plate part 383 of the urging member 303, respectively. Thus, the urging member 303 is positioned with respect to the panel cover 20.

In a state where the urging member 303 is positioned with respect to the panel cover 20, the end portions of the first fixing plate part 381 and the second fixing plate part 384 of the urging member 303 face the threaded bosses 224 from the DD side, respectively. Then, the positions of the through holes 341 and 384 formed on the first fixing plate part 381 and the second fixing plate part 384 of the urging member 303 respectively correspond to the positions of the screw holes 220 on the threaded bosses 224. Additionally, as shown in FIG. 10, the end portion of the second separating part 382B of the first positioning plate part 382 face the threaded boss 224 formed between the two projecting part 221 from the DD side via the L-shaped part 312 of the support frame 301. Then, the position of the through hole 342 of the second separating part 382B corresponds to the position of the screw hole 220 on the threaded boss 224 and the through hole 313 of the L-shaped part 312. The screw 380 is inserted in the each through hole 341, 342 and 343 and fastened with the screw holes 220. Thus, the urging member 303 is fixed to the panel cover 20.

In this state, the end parts 360E of the extending parts 360 of the urging member 303 get in the depressed part 326 formed in the rear face of the LCD 302. Then, the display unit 305 is urged towards the panel cover 20 due to spring of the end parts 306E of the extending parts 360 of the urging member 303.

Further, the central contacting parts 371, 372, 373 and 374 and the peripheral contacting parts 375, 376, 377 and 378 do not contact the rear face of the LCD 302 of the display unit 305 in a normal state where the display unit 305, such as the LCD 302, is not deformed. That is, there is a clearance between the central contacting parts 371, 372, 373 and 374 and the peripheral contacting parts 375, 376, 377 and 378 and the rear face of the LCD 302. The central contacting parts 371, 372, 373 and 374 and the peripheral contacting parts 375, 376, 377 and 378 contact the rear face of the LCD 302 when the display unit 305 is deformed.

<Touch Key Unit>

As shown in FIG. 6, the touch key unit 40 includes LED light guiding lenses 460, an electrostatic capacitive key substrate 402 and a second double-sided tape 401.

<LED Light Guiding Lenses>

The touch key unit 40 includes sixteen LED light guiding lenses 460. The twelve of the sixteen LED light guiding lenses 460 are arranged in the first touch key opening 205 of the panel cover 20 in a four by three matrix. The three LED light guiding lenses 460 are respectively disposed in the second touch key openings 206. The other one LED light guiding lenses 460 is disposed in the third touch key opening 207.

<Electrostatic Capacitive Key Substrate>

The electrostatic capacitive key substrate 402 has a rectangular shape. The electrostatic capacitive key substrate 402 is disposed on the DD side of the main part 20S of the panel cover 20. A peripheral portion of the electrostatic capacitive key substrate 402 is covered by the panel cover 20. A central portion of electrostatic capacitive key substrate 402 is covered by the panel plate 14. The electrostatic capacitive key substrate 402 includes sixteen touch key electrodes 450 and a power switch electrode 451. The sixteen touch key electrodes 450 and the power switch electrode 451 are formed on a surface of the electrostatic capacitive key substrate 402. The touch key electrodes 450 are disposed to face the LED light guiding lenses 460 from the DD side. The power switch electrode 451 is disposed to face the switch support 240 of the panel cover 20 from the DD side.

The electrostatic capacitive key substrate 402 includes a signal processing circuit (not shown). The touch key electrodes 450 and the power switch electrode 451 are electrically connected the signal processing circuit. When a touch position of the panel plate 14 which faces the touch key electrode 450 in the CC and DD direction is touched by the user with a finger, electrostatic capacitance between the finger and the touch key electrode 450 is changed. The signal processing circuit detects the change of the electrostatic capacitance and determines that the touch position is touched by the finger of the user based on the detection.

The electrostatic capacitive key substrate 402 has a first ground pattern 430 and a second ground pattern 440 as shown in FIG. 15. The first ground pattern 430 is formed to substantially surround the touch key unit 40. Specifically, the first ground pattern 430 has a rectangular frame shape surrounding the touch key electrodes 450 and the power switch electrode 451. The second ground pattern 440 has a ring shape surrounding the power switch electrode 451 (i.e., a portion facing the power switch in the CC and DD direction). The first ground pattern 430 and the second ground pattern 440 are grounded.

<Second Double-Sided Tape>

The second double-sided tape 401 is disposed between the main part 20S of the panel cover 20 and the electrostatic capacitive key substrate 402. The second double-sided tape 401 contacts the main part 20S of the panel cover 20 and the electrostatic capacitive key substrate 402. The second double-sided tape 401 has a polyester non-woven fabric and adhesives formed on the both side of the non-woven fabric. The second double-sided tape 401 has a substantially rectangular shape extending in the EE and FF direction.

The second double-sided tape 401 has a cutout part 420. The cutout part 420 has a substantially rectangular shape opening on the FF-side end of the second double-sided tape 401. The second double-sided tape 401 has end edges 421, 422, 423, 424 and 425. The end edge 421 extends in the AA and BB direction on the BB side of the cutout part 420. The end edge 422 extends on the EE side from the AA-side edge of the end edge 421. The end edge 423 extends on the AA side from the EE-side edge of the end edge 422. The end edge 424 extends on the FF side from the AA-side edge of the end edge 423. The end edge 425 extends on the AA side from the FF-side edge of the end edge 424. The end edge 421 and the end edge 425 are formed on the same straight line.

Figure 16:
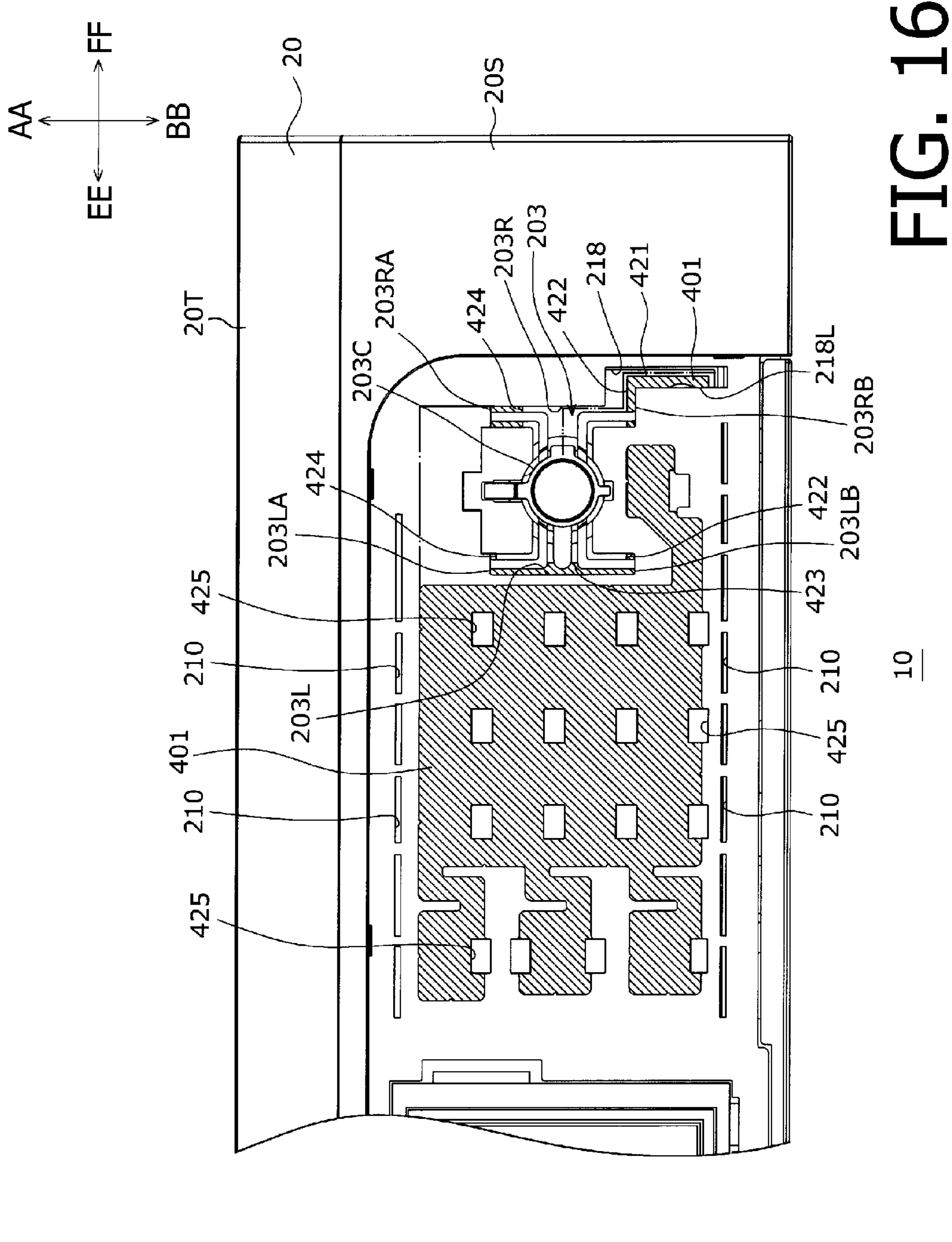
FIG. 16 shows an FF side end portion of the operation panel viewed from the CC side in a state where the panel plate is removed.
Figure 17:
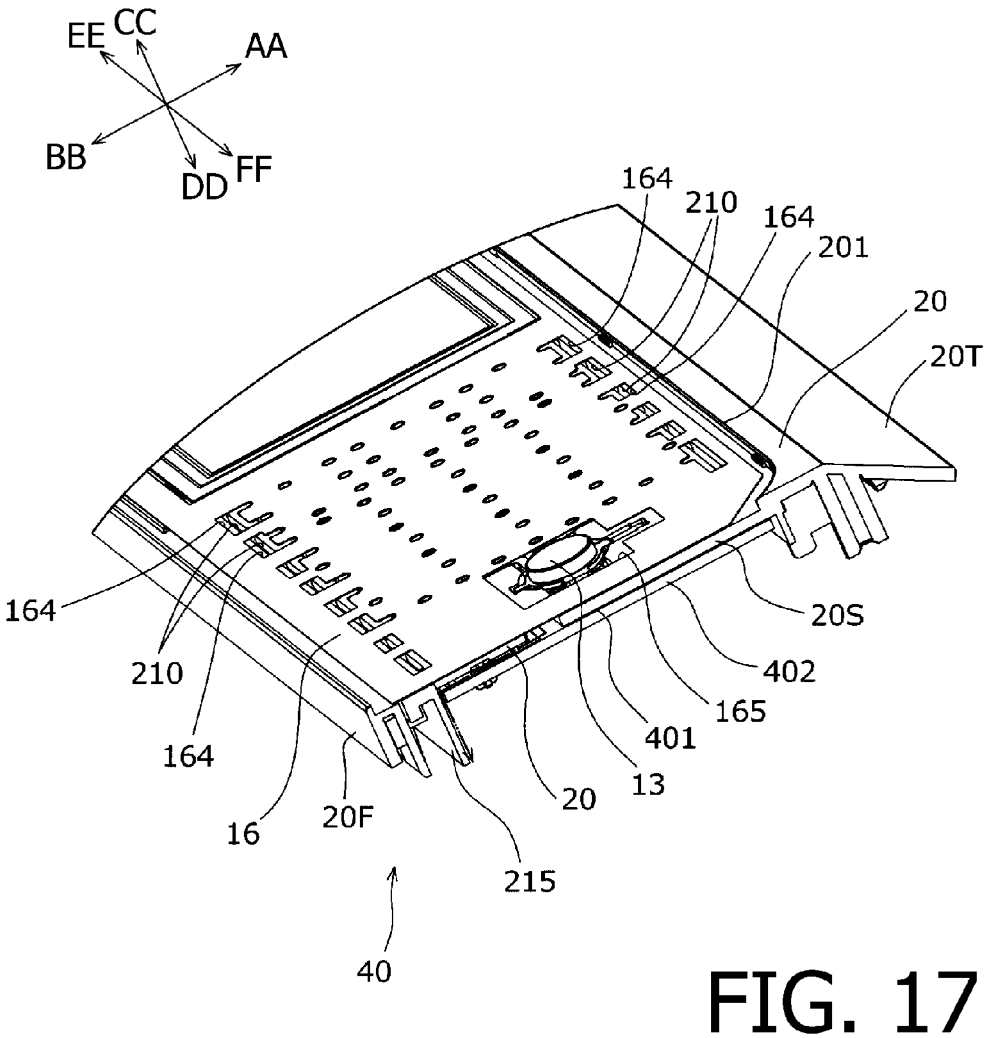
FIG. 17 is a perspective view showing the touch key unit in a state where the panel plate is removed.

The position of the cutout part 420 corresponds to the positions of the circular opening 203C of the power switch opening 203 formed on the panel cover 20 and the power switch electrode 451 of the electrostatic capacitive key substrate 402. As shown in FIG. 16, the end edge 421 is disposed on the FF side of an end edge 218L formed on the EE side of the water passage 218 of the panel cover 20. The end edge 422 is disposed on the AA side of end edges 203LB and 203RB formed on the BB side of the T-shaped openings 203L and 203R of the panel cover 20. The end edge 423 is disposed on the FF side of an end edge formed on the EE side of the T-shaped opening 203L. The end edge 424 is disposed on the BB side of end edges 203LA and 203RA formed on the AA side of the T-shaped openings 203L and 203R of the panel cover 20.

One end of the water passage 218 is connected with the BB-side end of the T-shaped opening 203R, and the other end is disposed on the BB side of a BB-side end edge of the electrostatic capacitive key substrate 402 and the touch key opening 202. The panel cover 20 is disposed at a slant with respect to the horizontal direction so that the one end of the water passage 218 is positioned above the other end. The other end of the water passage 218 opens to a direction facing the electrostatic capacitive key substrate 402.

When the user spills liquid, such as water, on the panel plate 14, the liquid may flow into a clearance between the power switch 13 and the circular opening 142 of the panel plate 14 toward the electrostatic capacitive key substrate 402. Even if the liquid flows on the electrostatic capacitive key substrate 402, the end edges 422, 423 and 424 of the second double-sided tape 401 can suppress flowing of the liquid toward the touch key electrodes 450 side. The electrostatic capacitive key substrate 402 is tilted to be parallel with the main part 20S of the panel cover 20. Thus, the liquid flown into the electrostatic capacitive key substrate 402 flows along the water passage 218 on the FF side of the end edge 421 of the second double-sided tape 401 as indicated in a two-dot chain line in FIG. 16. Then, the liquid flows from a clearance between the electrostatic capacitive key substrate 402 and the stiffing rib 215 of the panel cover 20 as indicated in a two-dot chain line in FIG. 17.

Additionally, the second double-sided tape 401 has a plurality of light through holes 427 and a light through cutout 426. The touch key unit 40 includes a plurality of LEDs (not shown). The light from the each LED incidents to the LED light guiding lenses 460 through the light through holes 427 and the light through cutout 426. Then, the light passed through the LED light guiding lenses 460 is transmitted through the first double-sided tape 16 and emitted to the panel plate 14. Thus, ten keys are displayed on the surface of the panel plate 14.

<NFC Unit>

As shown in FIG. 7, the NFC unit 50 includes an NFC substrate 500, a shield plate 502 and an elastic member 501.

<NFC Substrate>

The NFC substrate 500 has a substantially rectangular shape. The NFC substrate 500 includes a circuit to perform near field communication.

<Shield Plate>

The shield plate 502 is made of a sheet metal. The shield plate 502 is disposed between the NFC substrate 500 and a panel unit control substrate 503 to prevent input of extrinsic noise to the panel unit control substrate 503. The shield plate 502 has a main plate 525, four through hole plates 526, 527, 528 and 529 and a connecting plate 520.

The main plate has a substantially rectangular shape extending in the EE and FF direction.

The through hole plate 526 extends from the EE-side and AA-side end portion of the main plate 525 on the DD side, and then, turns and further extends on the AA side. The through hole plate 526 has a through hole 521 on its end portion.

The through hole plate 527 extends from the EE-side and BB-side end portion of the main plate 525 on DD side, and then, turns and further extends on the BB side. The through hole plate 527 has a through hole 522 on its end portion.

The through hole plate 528 extends from the FF-side and AA-side end portion of the main plate 525 on the DD side, and then, turns and further extends on the AA side. The through hole plate 528 has a through hole 523 on its end portion.

The through hole plate 529 extends from the FF-side and BB-side end portion of the main plate 525 on the DD side, and then, turns and further extends on the BB side. The through hole plate 529 has a through hole 524 on its end portion.

The connecting plate 520 extends from the FF-side end portion of the main plate 525 on the DD side, and then, turns and further extends on the FF side. The portion extending on the FF side of the connecting plate 520 has an L-shaped viewed from the CC and DD direction. Specifically, the L-shaped portion extends on the AA side and turns and further extends on the FF side. The connecting plate 520 has a through hole 530 on its end portion.

The main plate 525 has positioning holes 533 and 544 arranged on the BB-side end portion at an interval therebetween in the EE and FF direction. The positioning hole 533 on the EE side is a long hole having a long side in the EE and FF direction. The positioning hole 534 on the FF side has a circular shape.

<Elastic Member>

The elastic member 501 is made of sponge. The elastic member 501 has a cuboid shape. The elastic member 501 is disposed to adjust a clearance between the NFC substrate 500 and the shield plate 502.

<Panel Unit Control Substrate>

As shown in FIG. 7, the operation panel 10 includes the panel unit control substrate 503.

The panel unit control substrate 503 has a substantially rectangular shape. The panel unit control substrate 503 is disposed on the DD side of the shield plate 502. The panel unit control substrate 503 has through holes 552, 553, 554 and 555. The panel unit control substrate 503 has cutout parts 550 and 551 on the BB side. The panel unit control substrate 503 controls the electrostatic capacitive key substrate 402.

The operation panel 10 includes a FFC (Flexible Flat Cable) 561. One end of the FFC 561 is connected the electrostatic capacitive key substrate 402. The other end of the FFC 561 is connected the panel unit control substrate 503.

<Assembly of the NFC Unit>

Figure 18:
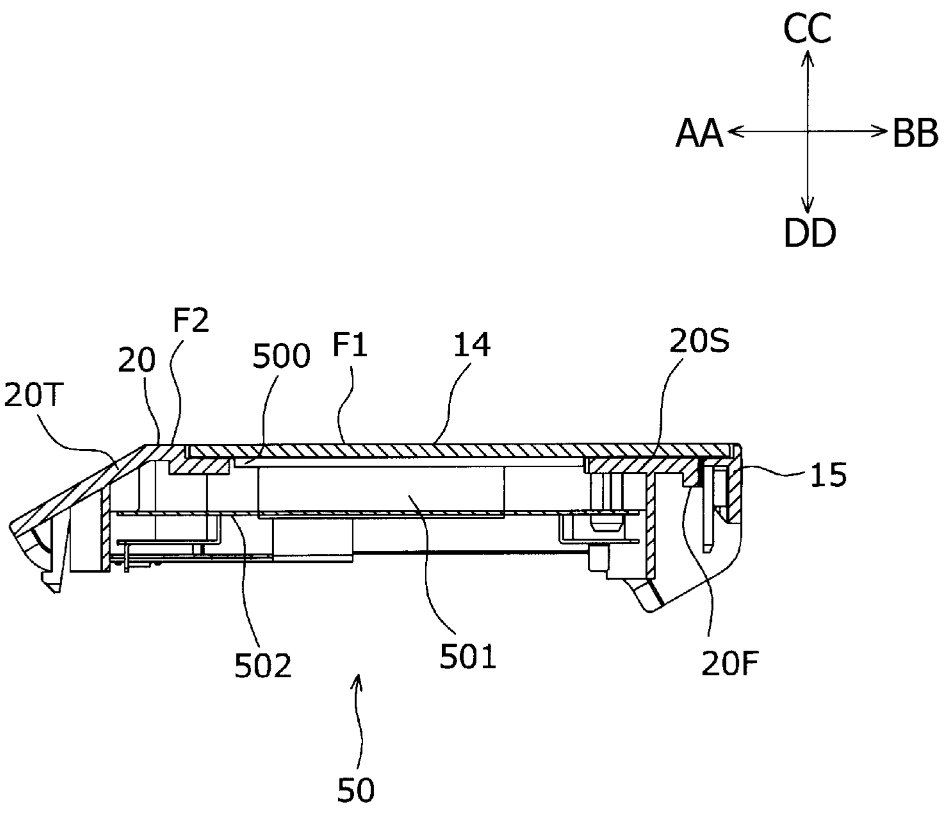
FIG. 18 is a cross-sectional side view schematically showing the NFC unit.

As shown in FIG. 18, the NFC substrate 500 is fitted in the NFC opening 204 of the panel cover 20. The CC-side face of the NFC substrate 500 contacts the DD-side face of the panel plate 14.

The shield plate 502 is displaced on the DD side of the NFC substrate 500 to face each other across a clearance. The protrusion parts 251 and 252 of the panel cover 20 are inserted in the positioning holes 533 and 534 of the shield plate 502. Thus, the shield plate 502 is positioned with respect to the panel cover 20.

In a state where the shield plate 502 is positioned with respect to the panel cover 20, the end portions of the through hole plates 526, 527, 528 and 529 of the shield plate 502 respectively contact the threaded bosses 224 formed on peripheral of the NFC opening 204 from the DD side. Then, the positions of the through holes 521, 522, 523 and 524 respectively correspond to the positions of the screw holes 220 of the threaded bosses 224. Additionally, the end portion of the connecting plate 520 of the shield plate 502 faces the threaded boss 224 of the panel cover 20 from the DD side across the second fixing plate part 384 of the urging member 303. Then, the position of the through hole 530 corresponds to the positions of the through hole 343 of the second fixing plate part 384 and the screw hole 220 of the threaded boss 224

The elastic member 501 is disposed between the NFC substrate 500 and the shield plate 502.

The panel unit control substrate 503 is disposed on the DD side of the shield plate 502. The positions of the through holes 552, 553, 554 and 555 of the panel unit control substrate 503 correspond to the positions of the through holes 521, 522, 523 and 524 of the shield plate 502, respectively.

Figure 19:
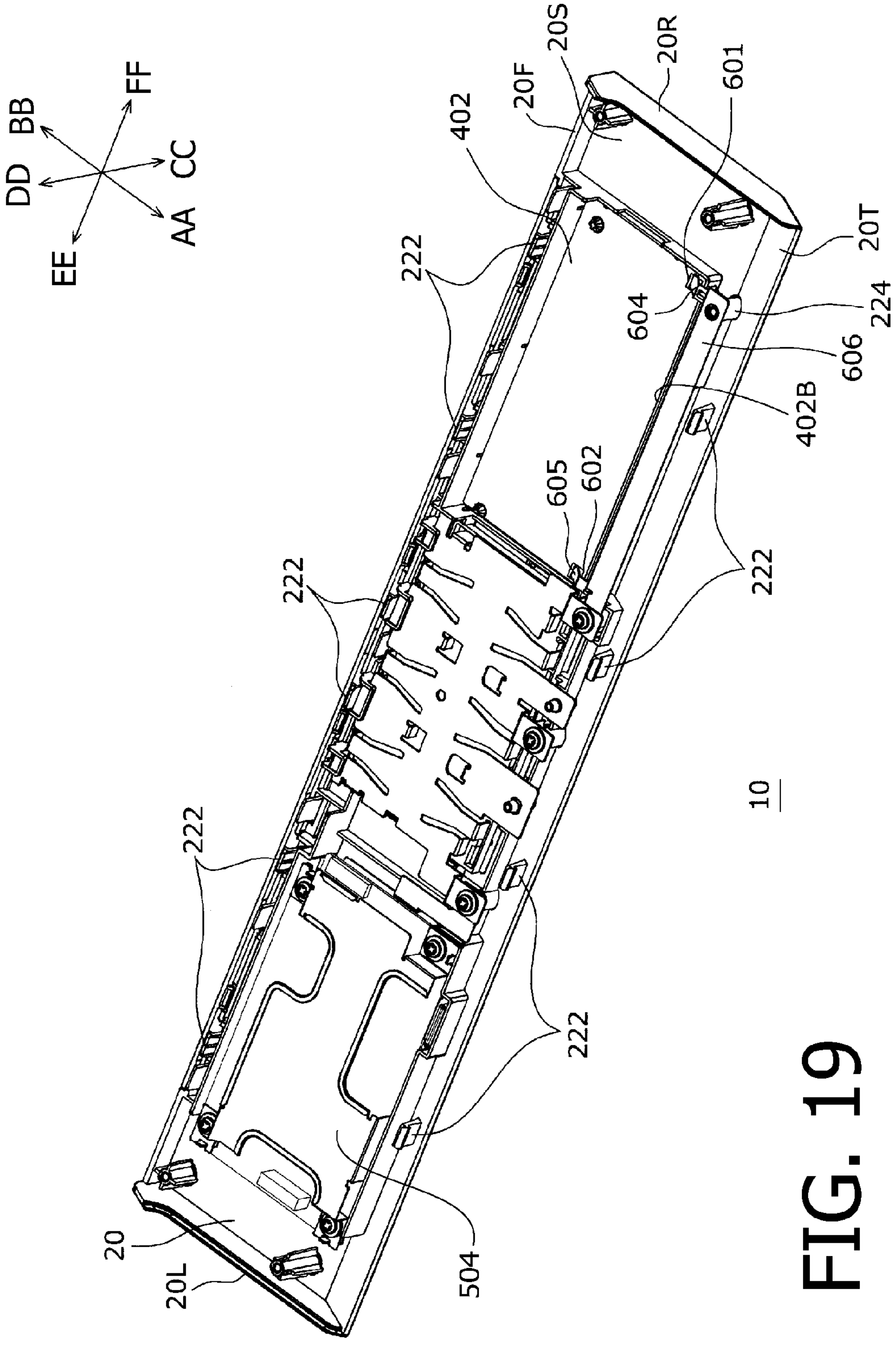
FIG. 19 is a perspective view showing a ground structure of the operation panel.

The operation panel 10 includes a metal cover 504 as shown in FIG. 19. The metal cover 504 is disposed on the DD side of the panel unit control substrate 503. The metal cover 504 has four through holes (not shown). The positions of those through holes of the metal cover 504 correspond to the positions of the through holes 552, 553, 554 and 555 of the panel unit control substrate 503, respectively. By inserting each screw 505 in the through holes of the metal cover 504, the panel unit control substrate 503 and the shield plate 502 and fastening with the screw hole 220, the panel unit control substrate 503 and the shield plate 502 is fixed between the metal cover 504 and the panel cover 20.

Additionally, the screw 505 is inserted in the through hole 530 of the shield plate 502 and the through hole 343 of the urging member 303, and fastened with the screw hole 220. Thus, the connecting plate 520 of the shield plate 502 and the second fixing plate part 384 of the urging member 303 are fixed to the threaded boss 224 of the panel cover 20.

<Ground Structure>

As shown in FIG. 19, the operation panel 10 includes a ground plate 606 and a plate springs 604 and 605.

The ground plate 606 is made of metal and has a rectangular shape extending in the EE and FF direction. The ground plate 606 connects the two threaded bosses 224 formed on the FF side and the AA side of the rear face of the main part 20*s*. The EE-side end portion of the ground plate 606 is nipped by the end portion of the first fixing plate part 381 and the threaded boss 224 and fixed to the threaded boss 24 together with the first fixing plate part 381.

The electrostatic capacitive key substrate 402 has two ground holes 601 and 602 on the AA-side end portion. The plate springs 604 and 605 are inserted into the ground holes 601 and 602, respectively. One ends of the plate springs 604 and 605 are electrically connected with the first ground pattern 430 and the second ground pattern 440 of the electrostatic capacitive key substrate 402, respectively. The other ends of the plate springs 604 and 605 contact the ground plate 606 from the DD side with spring.

Since the shield plate 502 contacts the metal cover 504, the shield plate 502 and the metal cover 504 are electrically conducted. Additionally, since the second fixing plate part 384 of the urging member 303 is connected with the connecting plate 520 of the shield plate 502, the urging member 303 and the shield plate 502 are electrically conducted. Additionally, since the first fixing plate part 381 of the urging member 303 is connected with the ground plate 606, the urging member 303 and the ground plate 606 are electrically conducted. Further, the first ground pattern 430 and the second ground pattern 440 of the electrostatic capacitive key substrate 402 and the ground plate 606 are electrically conducted via the plate springs 604 and 605. Therefore, the urging member 303, the shield plate 502, the metal cover 504, the ground plate 606, the plate springs 604 and 605 and the first ground pattern 430 and the second ground pattern 440 of the electrostatic capacitive key substrate 402 have the same electrical potential.

Figure 20:
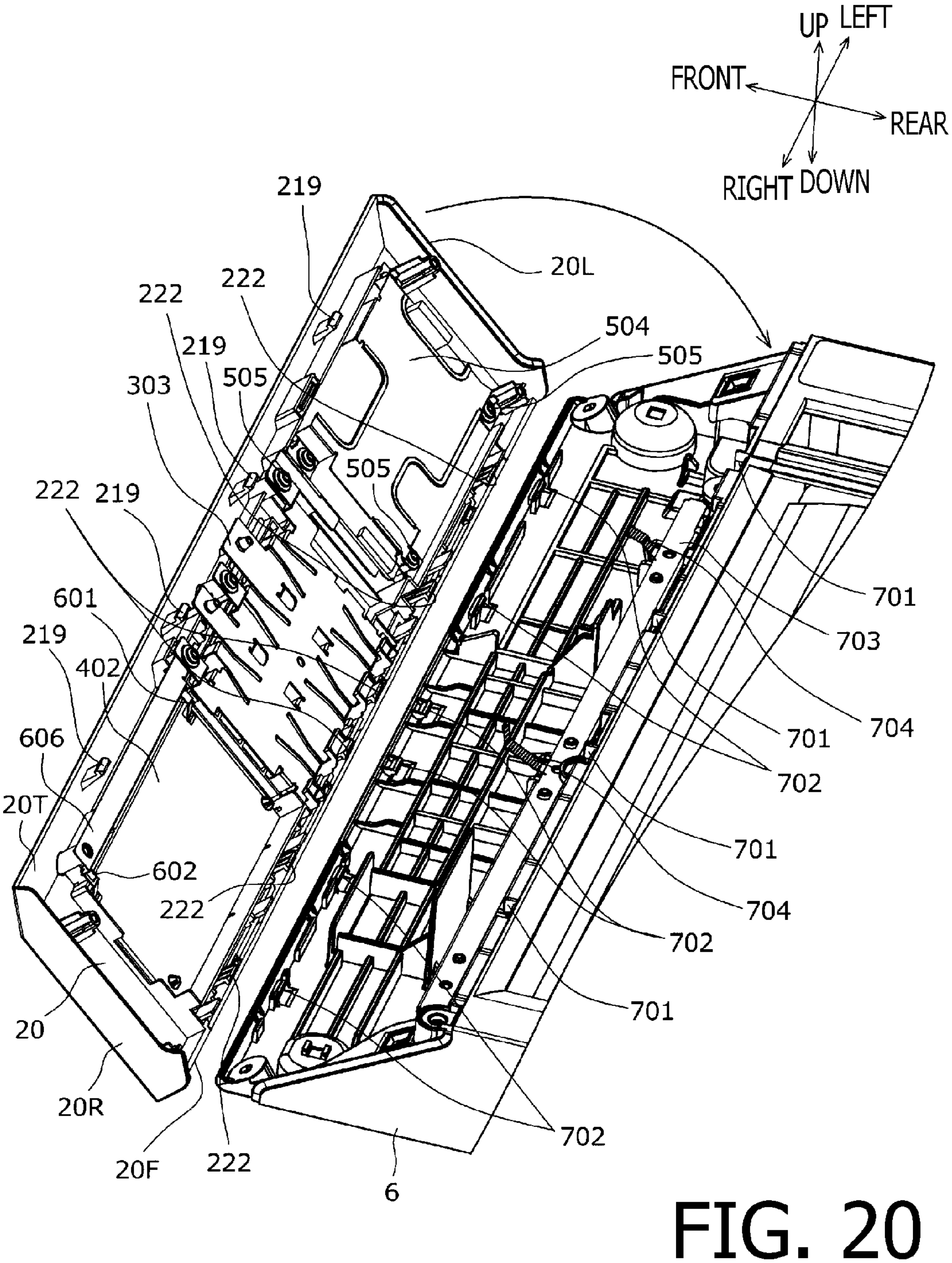
FIG. 20 is a perspective view showing a process of attaching the panel cover to a device body.

As shown in FIG. 20, the device body 6 of the image reading device 3 includes four locked parts 701 corresponding to the four locking parts 219 of the panel cover 20. The locked parts 701 extend on the front side from the upper end of the device body 6.

The device body 6 also includes six locked parts 702 corresponding to the six locking parts 222 of the panel cover 20. The locked parts 702 extend on the rear side from the front end of the device body 6.

In order to attach the operation panel 10 to the device body 6, the each locking part 222 of the panel cover 20 is firstly locked with the each locked part 702 of the device body 6. Then, the operation panel 10 is rotated around the locked parts 702 so that the upper part 20T of the panel cover 20 moves rearward. When the operation panel 10 is additionally rotated, the each locking part 219 of the panel cover 20 contacts the each locked part 701 of the device body 6 from upside. As the operation panel 10 is further rotated, the each locking part 219 is deformed and the end portion of the each locking part 219 slides into the each locked part 701. Thus, the each locking part 219 is locked by the each locked part 701 and the operation panel 10 is attached to the device body 6.

The device body 6 includes a device-side ground plate 703 made of metal. The device-side ground plate 703 extends in the right and left direction and is exposed when the operation panel 10 is removed from the device body 6. The device-side ground plate 703 is grounded.

Additionally, the device body 6 includes two coil springs 704. One end of the each coil spring 704 is connected with the device-side ground plate 703. In a state where the operation panel 10 is attached to the device body 6, the other end of the each coil spring 704 is connected with the urging member 303 and the metal cover 504. Thus, the urging member 303, the shield plate 502, the metal cover 504, the ground plate 606, the plate springs 604 and 605 and the first ground patter 430 and the second ground pattern 440 of the electrostatic capacitive key substrate 402 are electrically conducted with the device-side ground plate 703 via the coil springs 704. As a result, the urging member 303, the shield plate 502, the metal cover 504, the ground plate 606, the plate springs 604 and 605 and the first ground patter 430 and the second ground pattern 440 of the electrostatic capacitive key substrate 402 are grounded.

As described above, the document placing part 8A is disposed on the device body 6. The dividing member 9 is disposed on the left-side end portion of the document placing part 8A. The document sheet is placed on the document placing part 8A such that the left edge of the document sheet contacts the dividing member 9. The image on the document sheet is read by the CIS unit 100 movable in the right and left direction.

The touch key unit 40 is disposed on the left side of the device body 6 (i.e., an opposite side of a side on which the dividing member 9 is disposed). According to this configuration, unintended touch by the user to the touch key unit 40 upon placing the document sheet to contact the dividing member 9 can be suppressed.

The image reading device 3 includes the touch panel unit 30 disposed on the central portion of the device body 6 in the right and left direction.

According to this configuration, since the touch panel unit 30 is disposed away from the dividing member 9, the unintended touch by the user to the touch panel unit 30 upon placing the document sheet to contact the dividing member 9 can be suppressed.

The image reading device 3 includes the NFC unit 50 disposed on the left side end portion of the device body 6.

According to this configuration, the interactive communication between the non-contact IC card and the NFC unit 50 can be performed.

The NFC unit 50 of the image reading device 3 includes the panel unit control substrate 503 for controlling the electrostatic capacitive key substrate 402 which is disposed to face the NFC substrate 500, and the shield plate 502 for preventing the input of extrinsic noise to the panel unit control substrate 503 which is disposed between the NFC substrate 500 and the panel unit control substrate 503.

According to this configuration, a clearance is provided between the NFC substrate 500 and the shield plate 502. Thus, an effect by the shield plate 502 to the communication of the NFC substrate 500 can be suppressed.

The image reading device 3 includes the panel cover 20 supported by the device body 6 to cover the peripheral portion of the electrostatic capacitive key substrate 402. Additionally, the image reading device 3 includes the panel plate 14 supported by the panel cover 20 to cover the central portion of the electrostatic capacitive key substrate 402.

According to this configuration, since the panel plate 14 and the panel cover 20 are formed as separate members, there is high flexibility to design the panel plate 14 and the panel cover 20, such as color of them.

The surface F1 is a plane surface. The panel plate 14 is disposed to be surrounded by the surface F2 of the main part 20S of the panel cover 20. The panel cover 20 and the panel plate 14 are formed so that the surface F1 and the surface F2 are on the same plane.

According to this configuration, no step is formed on a boundary portion between the CC-side surface of the panel cover 20 and the surface of the panel plate 14. Thus, the user is prevented from touching an edge of the panel plate 14, and disengagement of the panel plate 14 from the panel cover 20 can be suppressed.

The image reading device 3 includes the panel front cover 15 of which upper end extends along the BB-side end of the panel plate 14. The upper end surface of the panel front cover 15 is disposed on the same plane as the surface F1 and the surface F2.

According to this configuration, no step is formed on a boundary portion between the BB-side end of the panel plate 14 and the upper end of the panel front cover 15. Thus, the user is prevented from touching edges of the panel plate 14 and the panel front cover 15, and disengagement of the panel plate 14 and the panel front cover 15 from the panel cover 20 can be suppressed.

<Modifications>

Only an exemplary embodiment of the disclosure and a few examples of their versatility are shown and described in the disclosure. It is to be understood that the disclosure is capable of use in various other combinations and environments and is capable of changes or modifications within the scope of the inventive concept as expressed herein.

For example, the above described embodiment adopts the electrophotographic system for image forming. However, the present invention can be applied when an inkjet system is adopted for image forming. In the inkjet system, an image is formed on a sheet by ejecting ink directly to the sheet fed by the sheet feed tray 4.

What is claimed is:

1. An image reading apparatus comprising:

a chassis;

a sheet supporting unit disposed on the chassis, wherein the sheet supporting unit includes a surface configured to receive a sheet of a document placed thereon;

a reading unit movably disposed on the chassis, wherein the reading unit includes a scanner configured to read an image on the sheet placed on the sheet supporting unit while moving in a predetermined direction;

a reference member provided at a side portion of the sheet supporting unit, the sheet being placed on the sheet supporting unit such that one end of the sheet contacts the reference member;

an electrostatic capacitive touch key unit disposed on a side portion of the chassis;

a near field communication unit; and a touch panel, wherein the touch panel is configured to be operated based on a change of pressure on a surface of the touch panel, wherein the reference member and the electrostatic capacitive touch key unit are arranged at opposite side portions, in the predetermined direction, of the chassis, wherein the touch panel is arranged between the reference member and the electrostatic capacitive touch key unit in the predetermined direction such that the touch panel is arranged nearer to the reference member than is the electrostatic capacitive touch key unit, and wherein the near field communication unit is arranged between the reference member and the touch panel in the predetermined direction such that the near field communication unit is arranged nearer to the reference member than are both the touch panel and the electrostatic capacitive touch key unit.

2. The image reading apparatus according to claim 1, wherein the touch panel is disposed on a central portion, in the predetermined direction, of the chassis.

3. The image reading apparatus according to claim 1, wherein the near field communication unit is disposed on a same side portion as the reference member, in the predetermined direction, of the chassis.

4. The image reading apparatus according to claim 3, wherein the near field communication unit comprises:

a near field communication substrate, wherein the near field communication substrate is configured to perform near field communication;

a control substrate disposed to face the near field communication substrate, wherein the control substrate is configured to control the electrostatic capacitive touch key unit;

a shield plate disposed between the near field communication substrate and the control substrate, wherein the shield plate is configured to prevent input of extrinsic noise to the control substrate; and a clearance adjusting member, wherein the clearance adjusting member includes an elastic member configured to adjust a clearance between the near field communication substrate and the shield plate.

5. The image reading apparatus according to claim 1, further comprising an operation panel including the electrostatic capacitive touch key unit, the operation panel comprising:

a panel cover supported by the chassis, on which the electrostatic capacitive touch key unit is disposed; and a panel plate attached to the panel cover and disposed to cover the electrostatic capacitive touch key unit.

6. The image reading apparatus according to claim 5, wherein, the panel cover is disposed to cover a peripheral portion of the electrostatic capacitive touch key unit; and the panel plate is disposed to cover a central portion of the electrostatic capacitive touch key unit.

7. The image reading apparatus according to claim 5, wherein a surface of the panel cover and a surface of the panel plate are on a same plane in a state where the panel plate is attached to the panel cover.

8. The image reading apparatus according to claim 7, further comprising a panel front cover supported by the panel cover, wherein an upper end surface of the panel front cover and the surface of the panel plate are on the same plane in the state where the panel plate is attached to the panel cover.

9. An image reading apparatus comprising:

a chassis;

a sheet supporting unit disposed on the chassis, wherein the sheet supporting unit includes a surface configured to receive a sheet of a document placed thereon;

a reading unit movably disposed on the chassis, wherein the reading unit includes a scanner configured to read an image on the sheet placed on the sheet supporting unit while moving in a predetermined direction;

a reference member provided at a side portion of the sheet supporting unit, the sheet being placed on the sheet supporting unit such that one end of the sheet contacts the reference member; and an operation panel having a plurality of operating units including an electrostatic capacitive touch key unit, a near field communication unit, and a touch panel, wherein the operation panel is configured to be operated for setting the image reading apparatus, and wherein the touch panel is configured to be operated based on a change of pressure on a surface of the touch panel, wherein the reference member and the electrostatic capacitive touch key unit are arranged at opposite side portions, in the predetermined direction, of the chassis, wherein the touch panel is arranged between the reference member and the electrostatic capacitive touch key unit in the predetermined direction such that the touch panel is arranged nearer to the reference member than is the electrostatic capacitive touch key unit, and wherein the near field communication unit is arranged between the reference member and the touch panel in the predetermined direction such that the near field communication unit is arranged nearer to the reference member than are both the touch panel and the electrostatic capacitive touch key unit.

* * * * *